United States Patent [19]
Yamauchi

[11] Patent Number: 6,028,455
[45] Date of Patent: Feb. 22, 2000

[54] SIGNAL TRANSMITTING CIRCUIT, SIGNAL RECEIVING CIRCUIT, SIGNAL TRANSMITTING/RECEIVING CIRCUIT, SIGNAL TRANSMITTING METHOD, SIGNAL TRANSMITTING/RECEIVING METHOD, SEMICONDUCTOR INTEGRATED CIRCUIT, AND CONTROL METHOD THEREOF

[75] Inventor: Hiroyuki Yamauchi, Osaka, Japan

[73] Assignee: Matsushita Electric Industrial Co., Ltd., Osaka, Japan

[21] Appl. No.: 08/994,128

[22] Filed: Dec. 19, 1997

Related U.S. Application Data

[62] Division of application No. 08/744,664, Nov. 6, 1996.

[30] Foreign Application Priority Data

Aug. 11, 1995 [JP] Japan ..................................... 7-289719

[51] Int. Cl.[7] ..................................................... G01R 19/00

[52] U.S. Cl. ................................. 327/52; 327/57; 327/65; 327/89; 327/201

[58] Field of Search ................................. 327/50, 52, 65, 327/89, 112, 178, 172, 57, 201

[56] References Cited

U.S. PATENT DOCUMENTS

| | | | |
|---|---|---|---|
| 4,739,198 | 4/1988 | Maruyama | 327/52 |
| 5,088,106 | 2/1992 | Kitamura et al. | 327/172 |

*Primary Examiner*—Huan Hoang
*Attorney, Agent, or Firm*—McDermott, Will & Emery

[57] ABSTRACT

In transmitting a first pair of differential clock signals UCLK, UXCLK having an extremely small amplitude voltage based on a power-source potential and a second pair of differential clock signals LCLK, LXCLK having an extremely small amplitude voltage based on the power-source potential, an inverting circuit as a signal receiving circuit is composed of a CMOS inverting circuit. A PMOS transistor composing the CMOS inverting circuit has a gate electrode and a source electrode receiving the first pair of differential clock signals. An NMOS transistor composing the CMOS inverting circuit has a gate electrode and a source electrode receiving the second pair of differential clock signals. When the potentials of the differential clock signals change, potentials at the respective gate and source electrodes of the two transistors shift in opposite directions, which surely cuts off the transistors. Accordingly, the signal receiving circuit composed of the inverting circuit operates statically in response to the first and second pairs of differential signals.

20 Claims, 32 Drawing Sheets

Fig. 25

|  | CONVENTIONAL EMBODIMENT (Multi-Vt) | TWELFTH EMBODIMENT | THIRTEENTH EMBODIMENT |
|---|---|---|---|
| Vt OF POWER-SOURCE-LINE SWITCH AND GROUNDING-LINE SWITCH | HIGHER THAN Vt OF LOGIC PORTION | LOWER THAN OR EQUAL TO Vt OF LOGIC PORTION | LOWER THAN OR EQUAL TO Vt OF LOGIC PORTION |
| $Vt(QP1)$ | -0.6V | -0.3V | -0.3V |
| $Vt(QN1)$ | 0.6V | 0.3V | 0.3V |
| Vt LOGIC PORTION Nch | 0.3V | 0.3V | 0.3V |
| Vt LOGIC PORTION Pch | -0.3V | -0.3V | -0.3V |
| POTENTIAL OF V1 (IN SLEEP STATE) | Vcc (3.3V) | Vcc (3.3V) | Vcc-dV (3.3V-0.3V) |
| POTENTIAL OF V2 (IN SLEEP STATE) | Vss (0.0V) | Vss (0.0V) | Vss+dV (0.0V+0.3V) |
| POTENTIAL OF V1 (IN ACTIVE STATE) | Vcc (3.3V) | Vcc (3.3V) | Vcc (3.3V) |
| POTENTIAL OF V2 (IN ACTIVE STATE) | Vss (0.0V) | Vss (0.0V) | Vss (0.0V) |
| POTENTIAL OF SG1 (IN SLEEP STATE) | Vcc (3.3V) | Vcc+dV (3.3V+0.3V) | Vcc (3.3V) |
| POTENTIAL OF SG2 (IN SLEEP STATE) | Vss (0.0V) | Vss-dV (0.0V-0.3V) | Vss (0.0V) |
| POTENTIAL OF SG1 (IN ACTIVE STATE) | Vss (0.0V) | Vss (0.0V) | Vss (0.0V) |
| POTENTIAL OF SG2 (IN ACTIVE STATE) | Vcc (3.3V) | Vcc (3.3V) | Vcc (3.3V) |

SIGNAL TRANSMITTING CIRCUIT, SIGNAL RECEIVING CIRCUIT, SIGNAL TRANSMITTING/RECEIVING CIRCUIT, SIGNAL TRANSMITTING METHOD, SIGNAL TRANSMITTING/RECEIVING METHOD, SEMICONDUCTOR INTEGRATED CIRCUIT, AND CONTROL METHOD THEREOF

This application is a division of 08/744,664 filed Nov. 6, 1996.

FIELD OF THE INVENTION

The present invention relates to improvements in semiconductor integrated circuits operating in synchronization with a clock signal, including such a large-scale integrated circuit as a microprocessor or signal processor. More particularly, it relates to a circuit and method for driving the clock signal or the like with low power consumption.

BACKGROUND OF THE INVENTION

Conventional technology for transmitting a clock signal in a semiconductor integrated circuit has imparted the clock signal with a full amplitude on the level of a power-source voltage corresponding to the difference between the power-source voltage and the ground voltage, since static operation is required of a receiving circuit for receiving the clock signal so that the output from the receiving circuit is varied based on the potential change of the clock signal.

With a large-scale chip, the following measures have been taken to minimize a clock skew resulting from a wiring delay (RC delay) so that the clock signal as a synchronization signal changes with the same timing at any portion on an entire chip:

(1) The width of a signal line is increased to reduce the influence of wiring resistance on the clock signal.

(2) Large-size drivers are distributed over the chip.

However, since the amplitude voltage of the clock signal conventionally used in the semiconductor integrated circuit has had the full amplitude on the level of the power-source voltage, power consumption for driving the clock signal is increased disadvantageously.

In the case of increasing the width of the signal line as mentioned in the foregoing measure (1), the wiring resistance may be reduced but the large-size drivers become necessary because of increased wiring capacitance. Therefore, each of the foregoing measures (1) and (2) has the drawback of increased power consumption for driving the clock signal, since the power for driving the drivers is increased.

SUMMARY OF THE INVENTION

It is therefore an object of the present invention to reduce the power consumption for driving the clock signal.

To attain the above object, the amplitude voltage of the clock signal may be adjusted to be extremely small but, in that case, the receiving circuit of conventional structure cannot operate statically any more.

The present invention provides a receiving circuit which can operate statically in response to the potential change of a clock signal to be transmitted even when the clock signal has an extremely small amplitude voltage, a driving circuit for driving the clock signal compatible with the receiving circuit, a semiconductor integrated circuit using the structure of the receiving circuit for receiving the clock signal, and a method of controlling the semiconductor integrated circuit.

To summarize the principle of the present invention, a pair of differential clock signals are differentially transmitted to be received by the gate and source electrodes of a transistor so that, when the potentials of the differential signals change, respective potentials at the gate and source electrodes of the transistor shift in opposite directions. This enables the transistor to operate statically with a potential difference double the potential difference between the differential clock signals. The present invention has been achieved by utilizing the static operation.

To attain the above object, the present invention provides a signal transmitting circuit for transmitting a signal to a signal receiving circuit, comprising: a differential-signal generating portion for expressing the signal as a pair of differential signals having potentials shifting in opposite directions, the potential of one of the differential signals being a potential at a power source of the signal receiving circuit; and a pair of lines for differentially transmitting the differential signals generated from the differential-signal generating portion.

The present invention provides a signal receiving circuit comprising a transistor, the signal receiving circuit receiving a pair of differential signals having potentials shifting in opposite directions, wherein respective potentials at at least two of a source electrode, a gate electrode, and a substrate electrode of the transistor change in synchronization with the change of the differential signals.

The present invention provides a signal transmitting method comprising: expressing a signal to be transmitted as a pair of differential signals having respective potentials shifting in opposite directions, the potential of one of the differential signals being a potential at a power source of a signal receiving circuit, and transmitting the differential signals.

The signal transmitting method of the present invention further comprises: receiving a signal having a first amplitude voltage; and converting the received signal to a pair of differential signals having a second amplitude voltage smaller than the first amplitude voltage which is based on the potential at the power source of the signal receiving circuit and transmitting the differential signals.

The present invention provides a signal receiving method comprising receiving a pair of differential signals having potentials shifting in opposite directions at any two of a source electrode, a gate electrode, and a substrate electrode of a transistor.

The present invention provides a signal transmitting/receiving method comprising: expressing a signal to be transmitted as a pair of differential signals having potentials shifting in opposite directions, the potential of one of the differential signals being a potential at a power source of a signal receiving circuit, and transmitting the differential signals; and receiving the transmitted differential signals at any two of a source electrode, a gate electrode, and a substrate electrode of a transistor.

The present invention also provides a signal transmitting circuit for transmitting a signal to a signal receiving circuit, comprising: a first differential-signal generating portion for expressing the signal as a pair of differential signals having potentials shifting in opposite directions, the potential of one of the differential signals being a potential at a power source of the signal receiving circuit; a second differential-signal generating portion for expressing the signal as the pair of differential signals, the potential of one of the differential signals being the ground potential; and two pairs of lines for differentially transmitting the two pairs of differential signals generated from the first and second differential-signal generating portions.

The signal transmitting method of the present invention further comprises: receiving a signal having a first amplitude voltage; converting the received signal to a pair of differential signals having a second amplitude voltage smaller than the first amplitude voltage which is based on a value in the vicinity of the potential at the power source of the signal receiving circuit; converting the received signal to a pair of differential signals having a third amplitude voltage smaller than the first amplitude voltage which is based on a value in the vicinity of the ground potential; and transmitting the pair of differential signals having the second amplitude voltage and the pair of differential signals having the third amplitude voltage.

The present invention also provides a signal receiving method comprising: receiving only a first pair of differential signals having a small amplitude voltage based on a voltage in the vicinity of a potential at a predetermined power source of a signal receiving circuit and a second pair of differential signals having a small amplitude voltage based on a voltage in the vicinity of a potential at a ground power source of the signal receiving circuit and outputting a third amplitude voltage larger than the respective amplitude voltages of the first and second pairs of differential signals by statically responding to electric changes of the first and second pairs of differential signals.

The present invention provides a signal transmitting/receiving method comprising: receiving a signal having a first amplitude voltage; converting the received signal to a pair of differential signals having potentials' shifting in opposite directions, the pair of differential signals having a second amplitude voltage smaller than the first amplitude voltage, the potential of one of the pair of differential signals being in the vicinity of a potential at a power source of a signal receiving circuit; converting the received signal to the pair of differential signals, the pair of differential signals having a third amplitude voltage smaller than the first amplitude voltage, the potential of one of the pair of differential signals being in the vicinity of the ground potential; transmitting the pair of differential signals having the second amplitude voltage and the pair of differential signals having the third amplitude voltage; and then receiving the transmitted two pairs of differential signals and outputting a signal having a fourth amplitude voltage larger than the second and third amplitude voltages of the two pairs of differential signals by statically responding to electric changes of the two pairs of differential signals.

In addition, the present invention provides a semiconductor integrated circuit comprising: switching means connected to a power-source line; and a circuit portion receiving power supplied from the power-source line by and via the switching means, the semiconductor integrated circuit further comprising potential control means for controlling a potential on the power-source line when the power is supplied from the power-source line to the circuit portion by the switching means and when the power supply is halted by the switching means.

In the semiconductor integrated circuit of the present invention, the switching means is composed of a transistor and the transistor has a source electrode connected to the power-source line, a drain electrode connected to the circuit portion, and a gate electrode connected to a gate-voltage control line.

In the semiconductor integrated circuit of the present invention, when the power supply to the circuit portion is halted by the switching means, the potential control means controls the potential on the power-source line and changes a potential on the gate-voltage control line in such a direction that the transistor is brought into a state with higher impedance till the potential on the gate-voltage control line exceeds a potential at the source electrode of the transistor.

The present invention also provides a semiconductor integrated circuit having such a pipeline structure that a logic circuit or an arithmetic circuit is divided into a plurality of stages in accordance with the sequence of procedures performed thereby, with a switch circuit and a latch circuit being disposed between the individual stages, said semiconductor integrated circuit comprising: first and second pairs of clock differential signal lines for transmitting first and second pairs of differential clock signals having voltages smaller than a power-source voltage; and control means disposed in each of the stages to receive the first and second pairs of differential clock signals from the first and second pairs of differential signal lines and generate another clock signal with which the control means controls the switch circuit in the corresponding stage.

The present invention provides a method of controlling a semiconductor integrated circuit having such a pipeline structure that a logic circuit or an arithmetic circuit is divided into a plurality of stages in accordance with the sequence of procedures performed thereby, with a switch circuit and a latch circuit being disposed between the individual stages, said method comprising: receiving a first pair of differential signals based on a power-source potential and a second pair of differential signals based on the ground potential to generate a clock signal having an amplitude voltage equal to the power-source potential; and controlling the switch circuit in each of the stages based on the generated clock signal.

The present invention also provides a semiconductor integrated circuit composed of a clocked inverting circuit comprising an inverting circuit for receiving data, inverting the data, and outputting inverted data, a first switch circuit disposed between the inverting circuit and a power-source line, and a second switch circuit disposed between the inverting circuit and a grounding line, said semiconductor integrated circuit having a pair of lines for transmitting a first pair of differential clock signals having potentials shifting in opposite directions, one of the pair of lines also serving as the power-source line and a pair of lines for transmitting a second pair of differential clock signals, one of the pair of lines also serving as the grounding line, wherein the first switch circuit is connected to the pair of lines for transmitting the first differential clock signals to be controlled by the first differential clock signals and the second switch circuit is connected to the pair of lines for transmitting the second differential clock signals to be controlled by the second differential clock signals.

The present invention also provides a semiconductor integrated circuit composed of a half latch circuit comprising: two clocked inverting circuits according to claim 67 being connected in cascade; and an inverting circuit for receiving an output from the clocked inverting circuits in the subsequent stage and inverting the output, wherein an output from the inverting circuit is feedbacked to the cascade connection point between the two clocked inverting circuit.

In transmitting the complementary pair of differential signals with the foregoing structure according to the present invention, the signal line which also serves as the power-source line or grounding line for the receiving circuit is used to transmit one of the differential signals. In other words, one of the differential signals is loaded on the power-source line or grounding line. The differential signals are received by two or more electrodes, e.g., the source and gate electrodes of the transistor composing the receiving circuit. Consequently, the potential at the gate electrode of the transistor composing the receiving circuit changes with the potential change of the other of the differential signals, while the power-source line or grounding line is coupled to the gate electrode of the transistor by capacitive coupling, so that the potential at the gate electrode having a small capacitance and electrically disconnected from the power-source line or grounding line having a large capacitance changes at a high speed in response to a potential change on the power-source line or grounding line (i.e., the potential change of one of the differential signals). Accordingly, even when the amplitude voltage of the differential signals is extremely small comparably to a fraction of the power-source voltage, the potential difference between two or more electrodes (e.g., the source and gate electrodes) of the transistor composing the receiving circuit changes greatly, resulting in static operation of the signal receiving circuit.

The above objects and novel features of the present invention will be more apparent from the reading of the following description in conjunction with the accompanying drawings.

BRIEF DESCRIPTION OF THE DRAWINGS

The accompanying drawings illustrate the preferred embodiments of the present invention.

In the drawings:

FIG. 25 is a view showing potential settings at specified portions of the semiconductor integrated circuit and threshold settings of specified transistors in the twelfth embodiment and a thirteenth embodiment of the present invention;

DETAILED DESCRIPTION OF THE INVENTION

Below, the preferred embodiments of the present invention will be described with reference to the drawings.

First Embodiment

Figure 1:
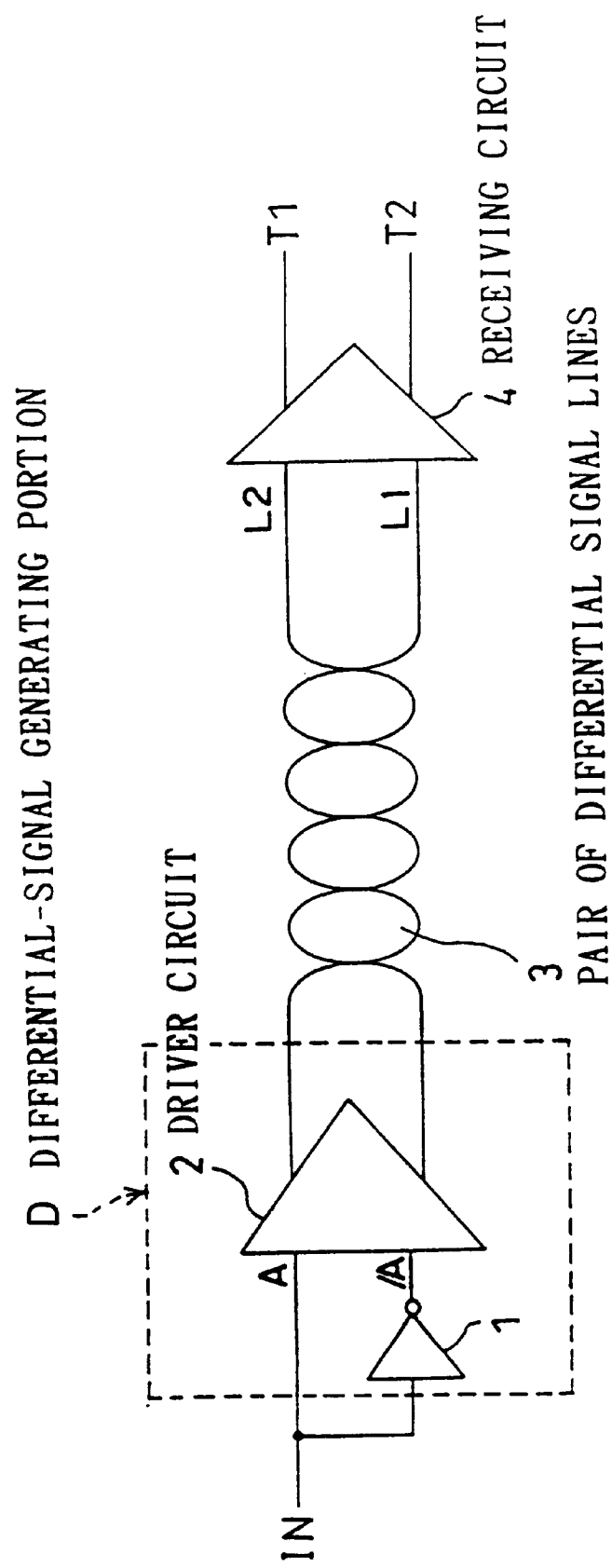
FIG. 1 is a schematic view showing the overall structure of a first embodiment of the present invention.

FIG. 1 is a schematic view showing the overall structure of a first embodiment of the present invention. The present embodiment proposes a circuit for transmitting and receiving a clock signal with a reduced difference in delay time at any portion on an entire chip when the system clock is distributed throughout the chip.

In the drawing are shown: a single-line input clock signal A having an amplitude voltage (first amplitude voltage) equal to the difference between a power-source potential and the ground potential; an inverter 1 for inverting the single-line input clock signal A; and a driving circuit 2 for receiving a pair of differential signals consisting of the single-line input clock signal A and an inversion signal /A from the inverter 1. The amplitude voltage (i.e., the first amplitude voltage) of the differential signals received by the driving circuit 2 has a full amplitude in a CMOS transistor. The driving circuit 2 generates a pair of differential signals having an amplitude voltage (second amplitude voltage) of amplitude smaller than that of the first amplitude voltage, based on the inputted differential signals. The inverter 1 and the driving circuit 2 constitute a differential-signal generating portion D.

Figure 2:
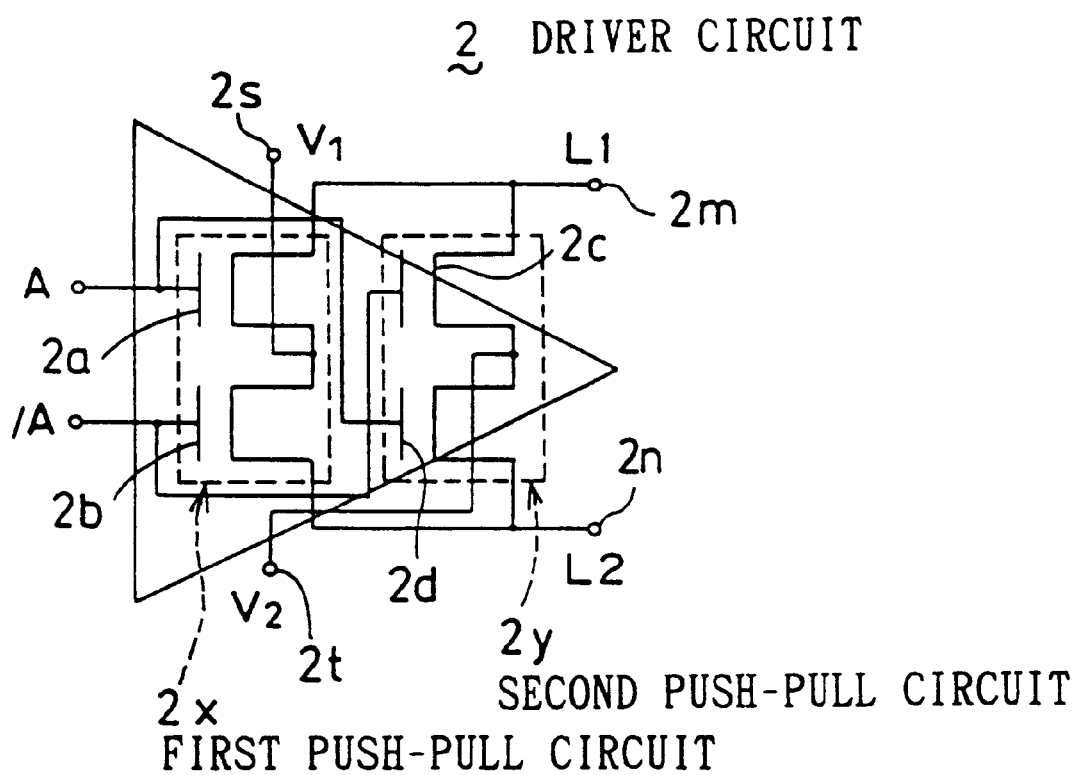
FIG. 2 is a view showing a specific structure of a driving circuit in the first embodiment of the present invention.

FIG. 2 shows the internal structure of the driving circuit 2 comprising a pair of output terminals 2m and 2n and first and second push-pull circuits 2x and 2y connected to the respective output terminals. The first push-pull circuit 2x is connected to a first power-source terminal 2s having a specified potential and has two NMOS transistors 2a and 2b. The respective gate electrodes of the NMOS transistors 2a and 2b receive the pair of differential signals A, /A. When one differential signal A is HIGH, the push-pull circuit 2x turns ON only one transistor 2a to connect the first power-source terminal 2s to the output terminal 2m. When the other differential signal /A is HIGH, the push-pull circuit 2x turns ON only the other transistor 2b to connect the first power-source terminal 2s to the output terminal 2n. The second push-pull circuit 2y is connected to a second power-source terminal 2t and has two NMOS transistors 2c and 2d. The respective gate electrodes of the NMOS transistors 2c and 2d receive the pair of differential signals A, /A. When one differential signal A is HIGH, the push-pull circuit 2y turns ON only the transistor 2d to connect the second power-source terminal 2t to the output terminal 2n. When the other differential signal /A is HIGH, the push-pull circuit 2y turns ON only the transistor 2c to connect the second power-source terminal 2t to the output terminal 2m. The potential difference V1–V2 between respective potentials V1 and V2 at the first and second power-source terminals 2s and 2t is smaller than the potential difference between the differential signals A, /A and equal to the second amplitude voltage. The potential 2V at the second power-source terminal 2t is, e.g., the ground potential.

In FIG. 1 are also shown: a pair of differential signal lines 3 driven by the driving circuit 2; and a receiving circuit (signal receiving circuit) 4 for receiving a pair of differential signals L1, L2 from the pair of differential signal lines. The receiving circuit 4 receives only the differential signals from the pair of differential signal lines 3 and outputs signals T1, T2 having an amplitude voltage (third amplitude voltage) larger than the second amplitude voltage.

Figure 3:
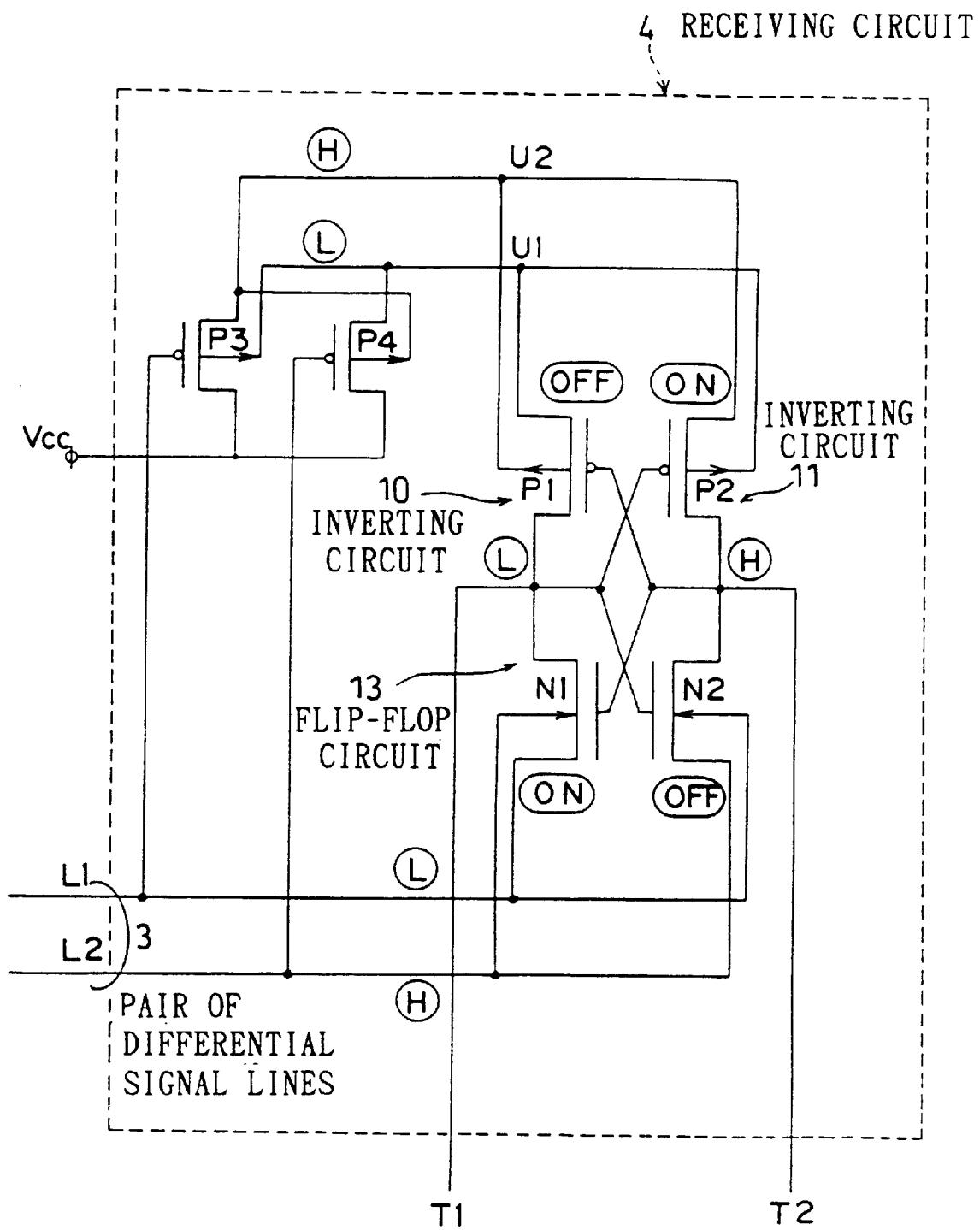
FIG. 3 is a view showing a specific structure of a receiving circuit in the first embodiment and an eighth embodiment of the present invention.

FIG. 3 shows a specific structure of the receiving circuit 4.

In the drawing are shown: a first CMOS inverting circuit 10 composed of a PMOS transistor P1 and an NMOS transistor N1 having respective drain electrodes connected in common; and a second CMOS inverting circuit 11 composed of a PMOS transistor P2 and an NMOS transistor N2 having respective drain electrodes connected in common.

The two inverting circuits 10 and 11 are connected in a flip-flop manner to compose a flip-flop circuit 13. The output terminals of the flip-flop circuit 13 correspond to a connection point T1 between the two transistors P1 and N1 composing the first inverting circuit 10 and a connection point T2 between the two transistors P2 and N2 composing the second inverting circuit 11.

The pair of source electrodes of the respective NMOS transistors N1 and N2 of the two inverting circuits 10 and 11 are individually connected to the pair of differential signal lines 3, while the pair of source electrodes U1 and U2 of the respective PMOS transistors P1 and P2 of the two inverting circuits 10 and 11 are individually connected to a power source Vcc via a pair of switches composed of first and second switch circuits P3 and P4, each composed of a PMOS transistor.

The pair of differential signal lines 3 are connected to the respective gate electrodes of the first and second switch circuit P3 and P4 to control the current driving abilities of the first and second switch circuits P3 and P4.

The two inverting circuits 10 and 11, the switch circuits P3 and P4, and the pair of differential signal lines 3 are connected as follows: That is, when the source electrode of the NMOS transistor N1 composing the inverting circuit 10 is connected to one of the differential signal lines (e.g., the line for L1), the other differential signal line (the line for L2) turns ON one (P4) of the pair of switches so that the source electrode of the PMOS transistor P2 of the other inverting circuit 11 is connected to the power source Vcc via the switch P4.

In the foregoing structure, if the potentials of the differential signals L1, L2 have the relationship shown in FIG. 3, the potential at the source electrode of the NMOS transistor N1 composing the inverting circuit 10 decreases with the decrease of one differential signal L1, so that the NMOS transistor N1 shows a tendency to move toward the ON state, while the potential at the output terminal T1 begins to decrease.

On the other hand, the potential at the source electrode of the NMOS transistor N2 composing the other inverting circuit 11 increases with the increase of the potential of the other differential signal L2, while the potential at the gate electrode thereof decreases with the decrease of the potential at the output terminal T1, so that the transistor N2 is turned OFF. At that time, both the PMOS transistor P2 of the inverting circuit 11 and the switch P3 are turned ON, so that power is supplied from the power source Vcc to the output terminal T2 via the PMOS transistor P2 and the switch P3, resulting in a potential increase at the output terminal T2.

In addition to the potential decrease at the source electrode of the NMOS transistor N1 of the inverting circuit 10, a potential at the gate electrode thereof is increased by the potential increase at the output terminal T2, so that the NMOS transistor N1 moves closer to the ON state and the potential at the output terminal T1 decreases more.

Accordingly, the respective potentials at the output terminals T1 and T2 are stably fixed. When the potentials of the differential signals change, the potential at each of the source and gate electrodes of the NMOS transistors N1 and N2 changes in synchronization with the potential changes of the differential signals, so that the potentials at the pair of output terminals T1 and T2 change at a high speed.

Second Embodiment

Below, a second embodiment of the present invention will be described with reference to FIG. 4.

The description will be limited to portions different from the above first embodiment. FIG. 4 shows an improved receiving circuit 4' characterized in that a pair of nodes, which serve not only as a pair of connections between the pair of NMOS transistors N1 and N2 and the pair of PMOS transistors P1 and P2 but also as the respective gate electrodes of the pair of NMOS transistors N1 and N2 and as the pair of output terminals T1 and T2, are connected to the pair of differential signal lines 3 via a pair of capacitors 15a and 15b.

Figure 4:
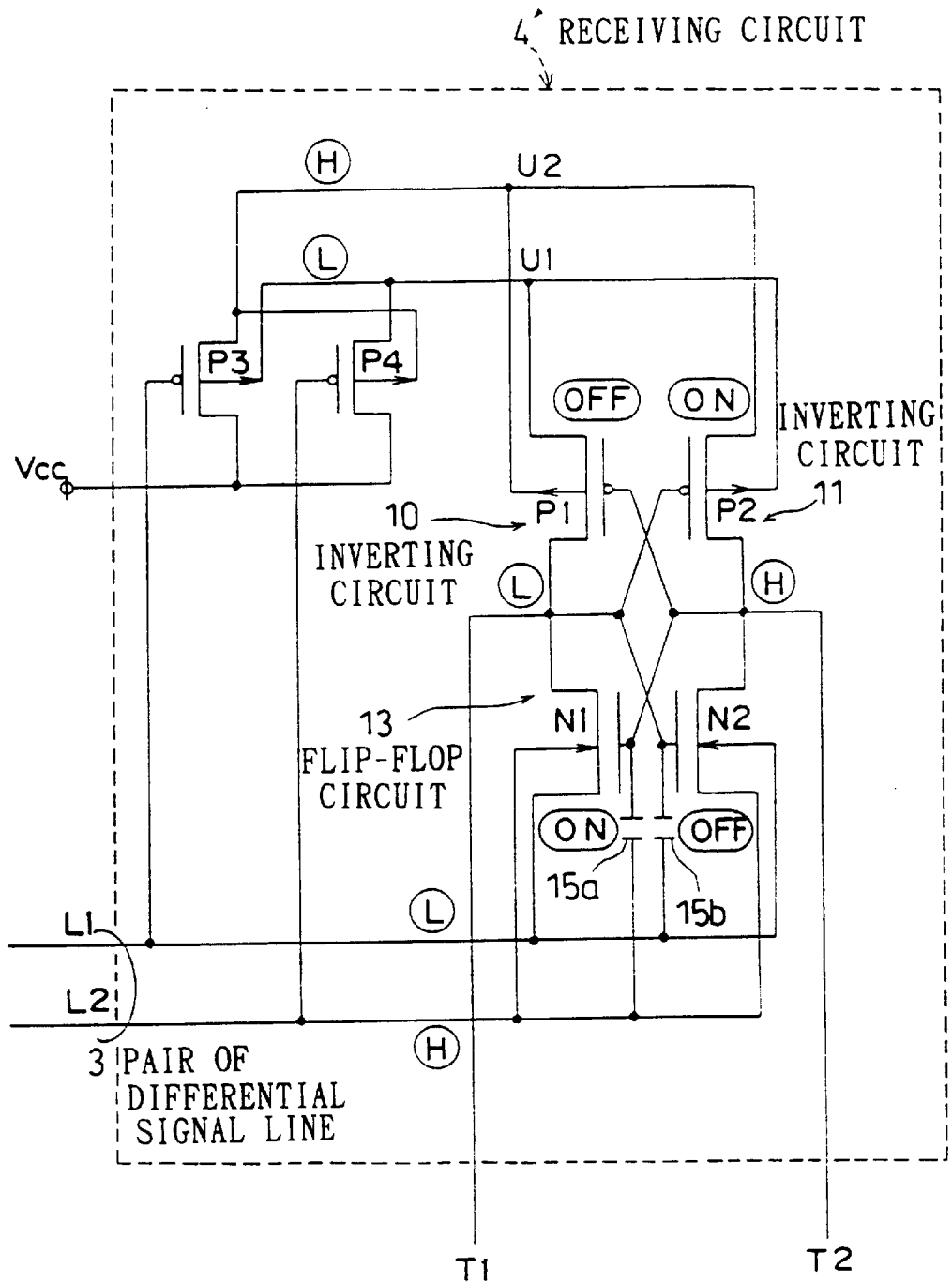
FIG. 4 is a view showing a specific structure of the receiving circuit in a second embodiment and the eighth embodiment of the present invention.

In FIG. 4, the NMOS transistors N1 and N2 are cross-coupled to the pair of differential signal lines 3 via the capacitors 15a and 15b. Specifically, the source and gate electrodes of the NMOS transistor N1 receive the differential signals L1, L2, respectively, while the source and gate electrodes of the NMOS transistor N2 receive the differential signals L2, L1, respectively.

In the foregoing structure, the potentials at the respective gate and source electrodes of the NMOS transistors N1 and N2 are concurrently controlled, so that the pair of NMOS transistors N1 and N2 exhibit impedance changes at a high speed in response to the potential changes of the inputted differential signals L1, L2, resulting in higher-speed potential changes at the pair of output terminals T1 and T2.

Third Embodiment

Below, a third embodiment of the present invention will be described with reference to FIG. 5. The description will be limited to portions different from the above first and second embodiments.

Figure 5:
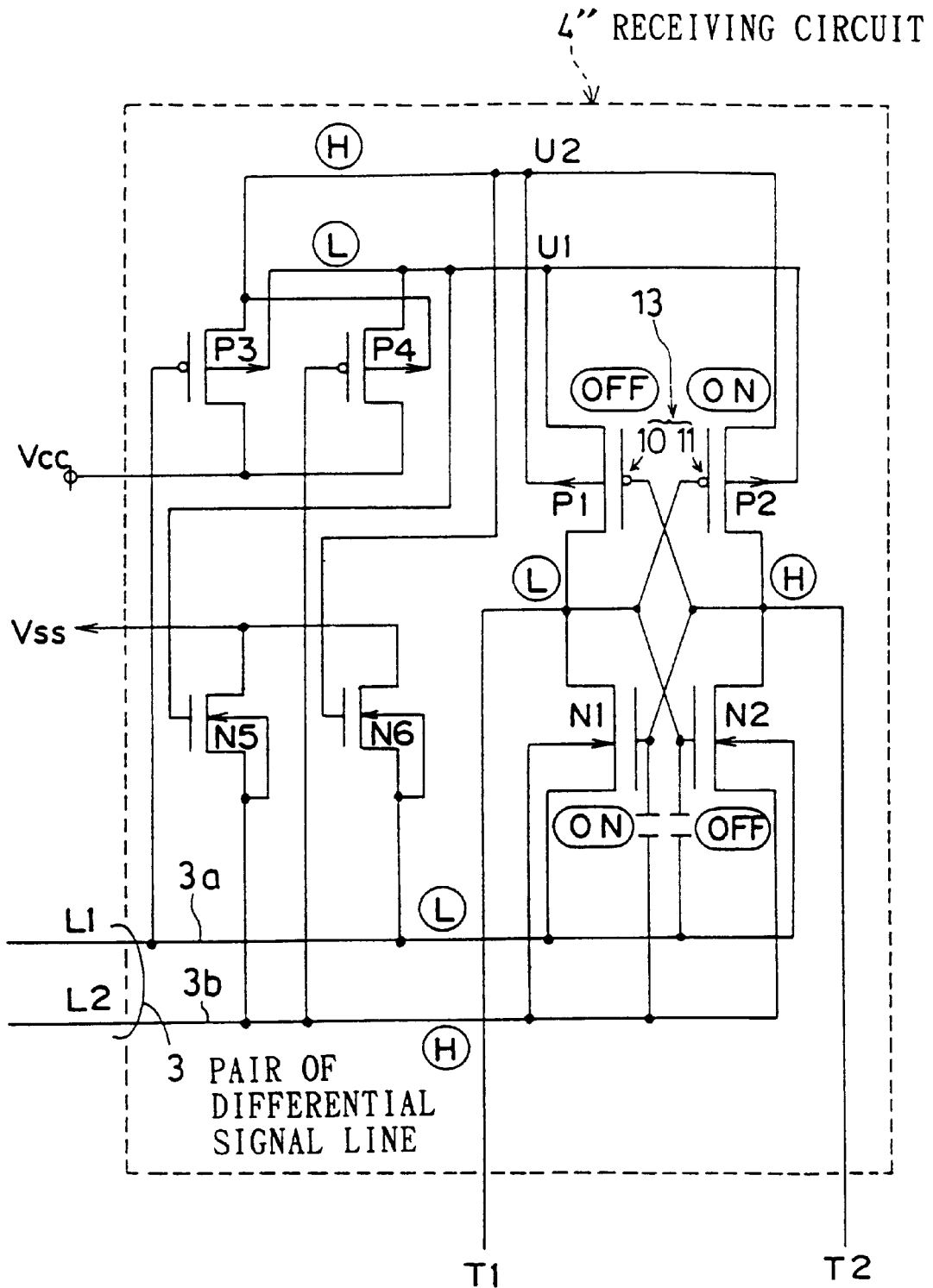
FIG. 5 is a view showing a specific structure of the receiving circuit in a third embodiment, a seventh embodiment, and the eighth embodiment of the present invention.

FIG. 5 shows a variation of the receiving circuit. In a receiving circuit 4" shown in the drawing, two switch circuits N5 and N6 composed of NMOS transistors form a pair of switches. One switch circuit (first switch circuit) N6 is disposed between one differential signal line 3a and a grounding line Vss and has a gate electrode connected to the source electrode U2 of the PMOS transistor P2 composing the second CMOS inverting circuit 11. The other switch circuit (second switch circuit) N5 is disposed between the other differential signal line 3b and the grounding line Vss and has a gate electrode connected to the source electrode U1 of the PMOS transistor P1 composing the first CMOS inverting circuit 10.

In the present embodiment, when one differential signal L1 has the ground potential and the other differential signal L2 has a potential higher than the ground potential by the difference between the differential potentials, the NMOS transistor N6 forming one of the pair of switches is turned ON to connect the line 3a for one differential signal L1 to the grounding line Vss, so that it becomes possible to stably hold the signal line, which should intrinsically be fixed at the ground potential, at the ground potential in the vicinity of the input of the receiving circuit. Accordingly, there can be achieved the effect of compensating for the difference in reference voltage between the position at which the driving circuit 2 is placed and the position at which the receiving circuit 4" is placed, i.e., the difference in ground level, reducing the influence of different potentials on the grounding line on the chip, or suppressing a potential increase on a signal line resulting from wiring resistance.

Fourth Embodiment

A fourth embodiment of the present invention will be described with reference to FIG. 6.

The description will be limited to portions different from the above third embodiment. In the receiving circuit 4" of the third embodiment, the respective gate electrodes of the pair of NMOS transistors N5 and N6 are connected to the respective source electrodes U1 and U2 of the pair of PMOS transistors P1 and P2 in the flip-flop circuit 13. In a receiving circuit 4'" of the present embodiment, however, the respective gate electrodes of NMOS transistors N5' and N6' are connected to the pair of differential signal lines 3. The drain and gate electrodes of the NMOS transistors N5' and N6' are connected in a cross-coupled configuration. Specifically, the NMOS transistor N6' has the drain electrode receiving one differential signal L1 and the gate electrode receiving the other differential signal L2. The NMOS transistor N5' has the drain electrode receiving the differential signal L2 and the gate electrode receiving the differential signal L1.

Therefore, the present embodiment also achieves the effect of enabling stable operation of the receiving circuit 4'" by fixing the signal line, which should intrinsically be on the ground level Vss at the position at which the receiving circuit 4'" is placed, to the same ground level Vss as achieved at the point at which the driving circuit 2 is placed, similarly to the third embodiment.

Moreover, in contrast to the third embodiment in which both of the NMOS transistors N5 and N6 are turned ON with low impedance, only one of the NMOS transistors N5' and N6' is turned ON in the present embodiment, so that the difference between the impedances of the differential signal lines against the ground is increased, which enables higher-speed operation with more stability.

Fifth Embodiment

Below, a fifth embodiment of the present invention will be described with reference to FIG. 7.

The description will be limited to the difference between the above first to fourth embodiments and the present fifth embodiment. The present embodiment is different from the foregoing embodiments in the structure of each of the inverting circuits forming the pairs connected in a flip-flop manner in a receiving circuit 4"" shown in FIG. 7.

Figure 6:
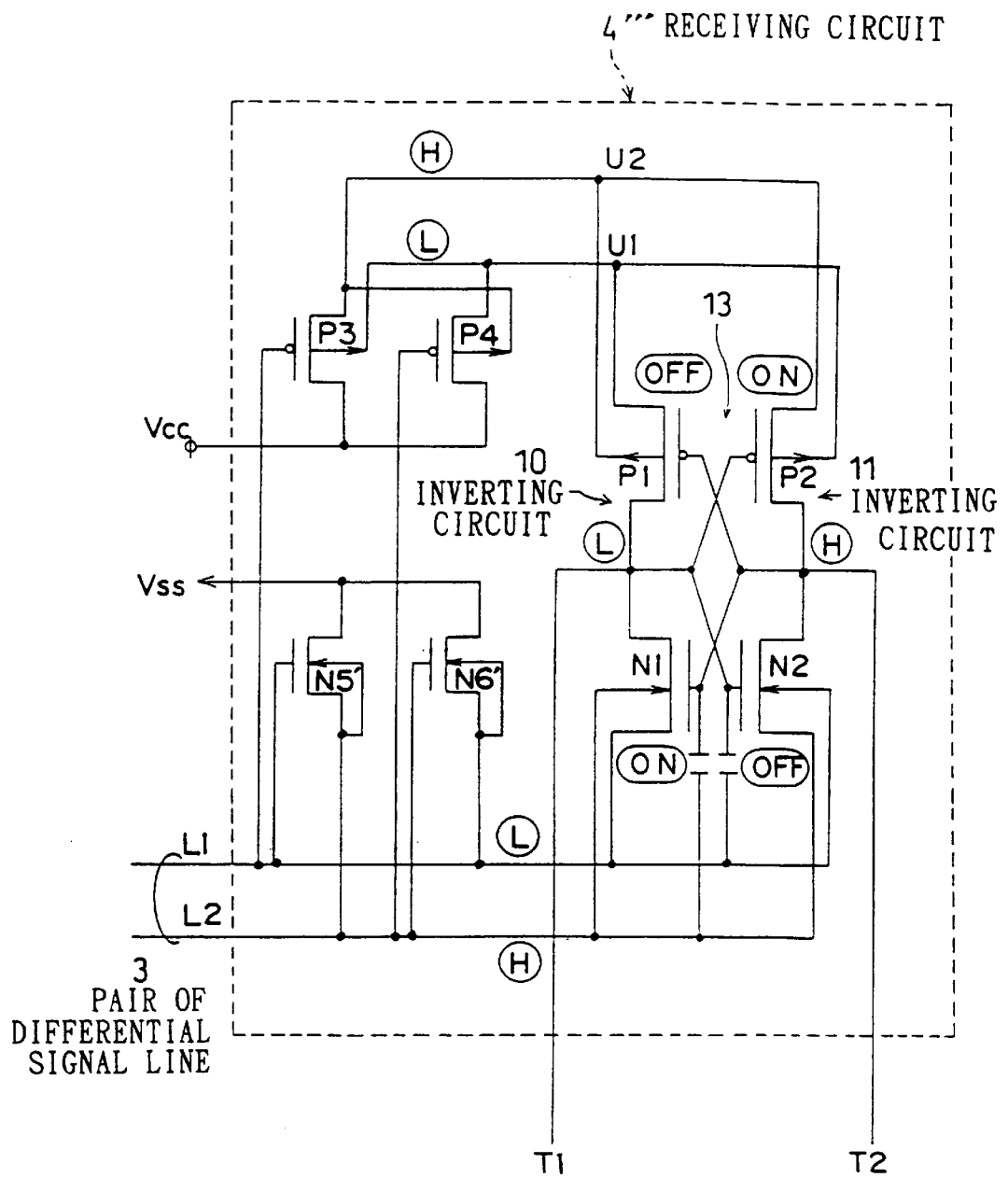
FIG. 6 is a view showing a specific structure of the receiving circuit in a fourth embodiment and the eighth embodiment of the present invention.

Instead of the PMOS transistors P1 and P2 composing the pair of inverting circuits 10 and 11 in the fourth embodiment depicted in FIG. 6, the present embodiment has used NMOS transistors N3 and N4 to compose a power-source load circuit so that each of the NMOS transistors N3 and N4 operates in a saturation region.

With the arrangement, the HIGH level at the pair of output terminals T1 and T2 of the flip-flop circuit 13' composed of the first and second NMOS inverting circuits 10' and 11' becomes lower than the potential at the power source Vcc by the magnitude of the threshold voltage of each of the NMOS transistors N3 and N4. However, if the threshold voltage of each of the NMOS load transistors N3 and N4 is adjusted to be lower than a normal value, the influence of the lower HIGH level can be minimized.

Diode connection points 10a' and 11a' between the respective gate and drain electrodes of the NMOS load transistors N3 and N4 are connected to the power source Vcc via the pair of switches composed of the two PMOS transistors (first and second switch circuits) P3 and P4 so that the two PMOS transistors P3 and P4 composing the pair of switches are controlled by the differential signals L1, L2. Accordingly, the pair of switches P3 and P4 control the respective impedances of the NMOS load transistors N3 and N4 against the power source Vcc, so that the potentials at the pair of output terminals T1 and T2 change at a higher speed in response to the potential changes of the differential signals L1, L2.

Sixth Embodiment

Below, a sixth embodiment of the present invention will be described with reference to FIG. 8.

Figure 13:
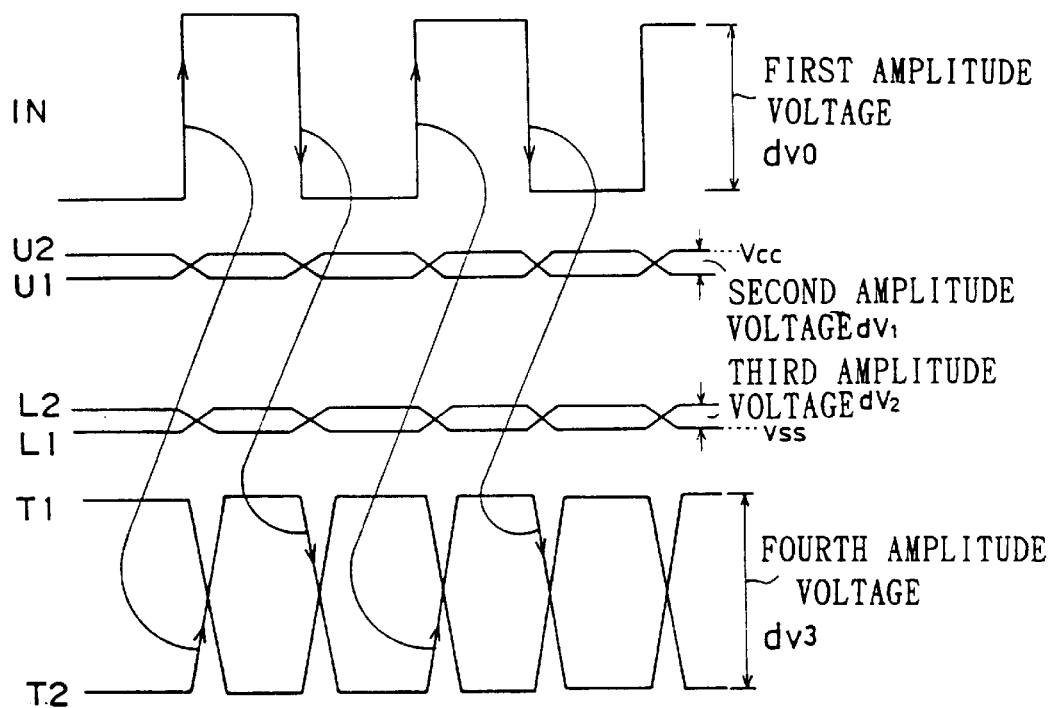
FIG. 13 is a timing chart of the receiving circuits in the ninth embodiment of the present invention.

In the drawing are shown: inverters 20 and 21 for inverting an external clock signal IN having a first amplitude voltage dV0 of full amplitude in a CMOS transistor, as shown in signal waveforms of FIG. 13; and first and second driving circuits 22 and 23 for receiving the external clock signal IN and the inversion signal thereof and outputting a pair of differential signals having an extremely small amplitude voltage. The inverter 20 and the first driving circuit 22 constitute a first differential-signal generating portion 27, while the inverter 21 and the second driving circuit 23 constitute a second differential-signal generating portion 28.

The first driving circuit 22 generates a pair of differential signals U1, U2 as shown in FIG. 13. The differential signals U1, U2 have a second amplitude voltage dV1 (dV1<dV0) of amplitude smaller than that of the first amplitude voltage dV0 based on the power-source potential Vcc. Namely, the differential signals U1, U2 are composed of a combination of potentials, one of which is the power-source potential Vcc and the other of which is different from the power-source potential Vcc by the magnitude of the extremely small voltage dV1.

On the other hand, the second driving circuit 23 generates a pair of differential signals L1, L2 as shown in FIG. 13. The differential signals L1, L2 have a third amplitude voltage dV2 (dV2<dV0) of amplitude smaller than that of the first amplitude voltage dV0 based on the ground potential Vss. Namely, the differential signals L1, L2 are composed of a combination of potentials, one of which is the ground potential Vss and the other of which is different from the ground potential Vss by the magnitude of the extremely small voltage dV2. The internal structure of the first and second driving circuits 22 and 23 is the same as the structure shown in FIG. 2, and will be described later in greater detail in the ninth embodiment.

Figure 8:
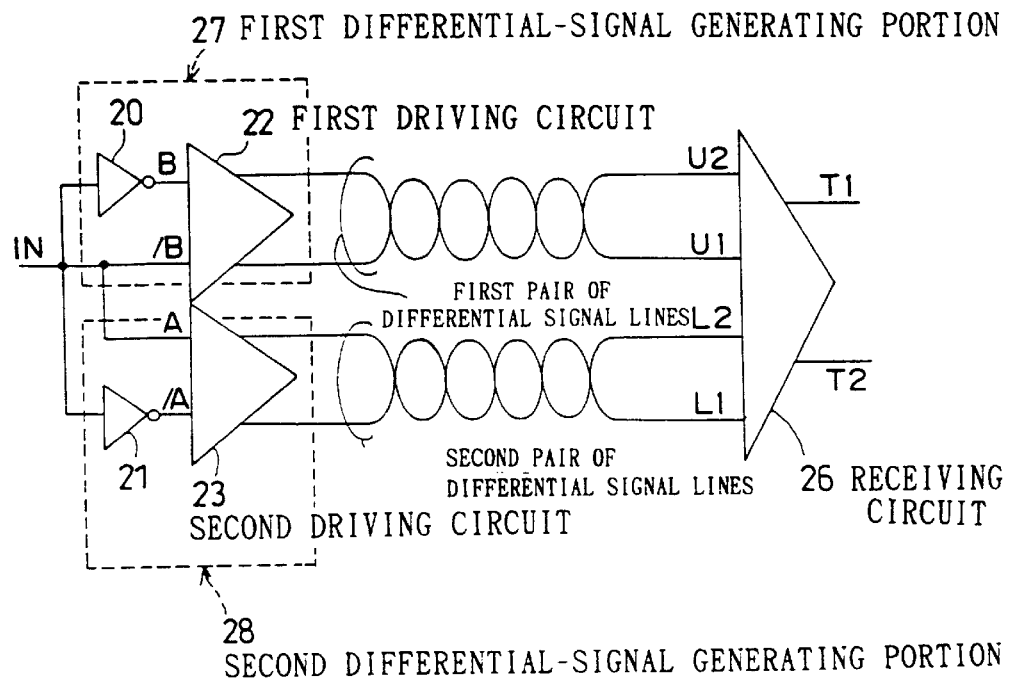
FIG. 8 is a schematic view showing the overall structure of a sixth embodiment of the present invention.

In FIG. 8 are also shown: first and second pairs of differential signal lines 24 and 25 to which the differential signals are transmitted from the driving circuits 22 and 23, respectively; and a receiving circuit (signal receiving circuit) 26 for receiving the first and second pairs of differential signals transmitted onto the two pairs of differential signal lines 24 and 25.

The receiving circuit 26 receives only the first and second pairs of differential signals and responds statically to the electric changes of the inputs so as to output a pair of differential signals T1, T2 having a fourth amplitude voltage dV3 (dV3>dV1 and dV2) of amplitude larger than those of the second and third amplitude voltages dV1 and dV2, as shown in FIG. 13.

Figure 9:
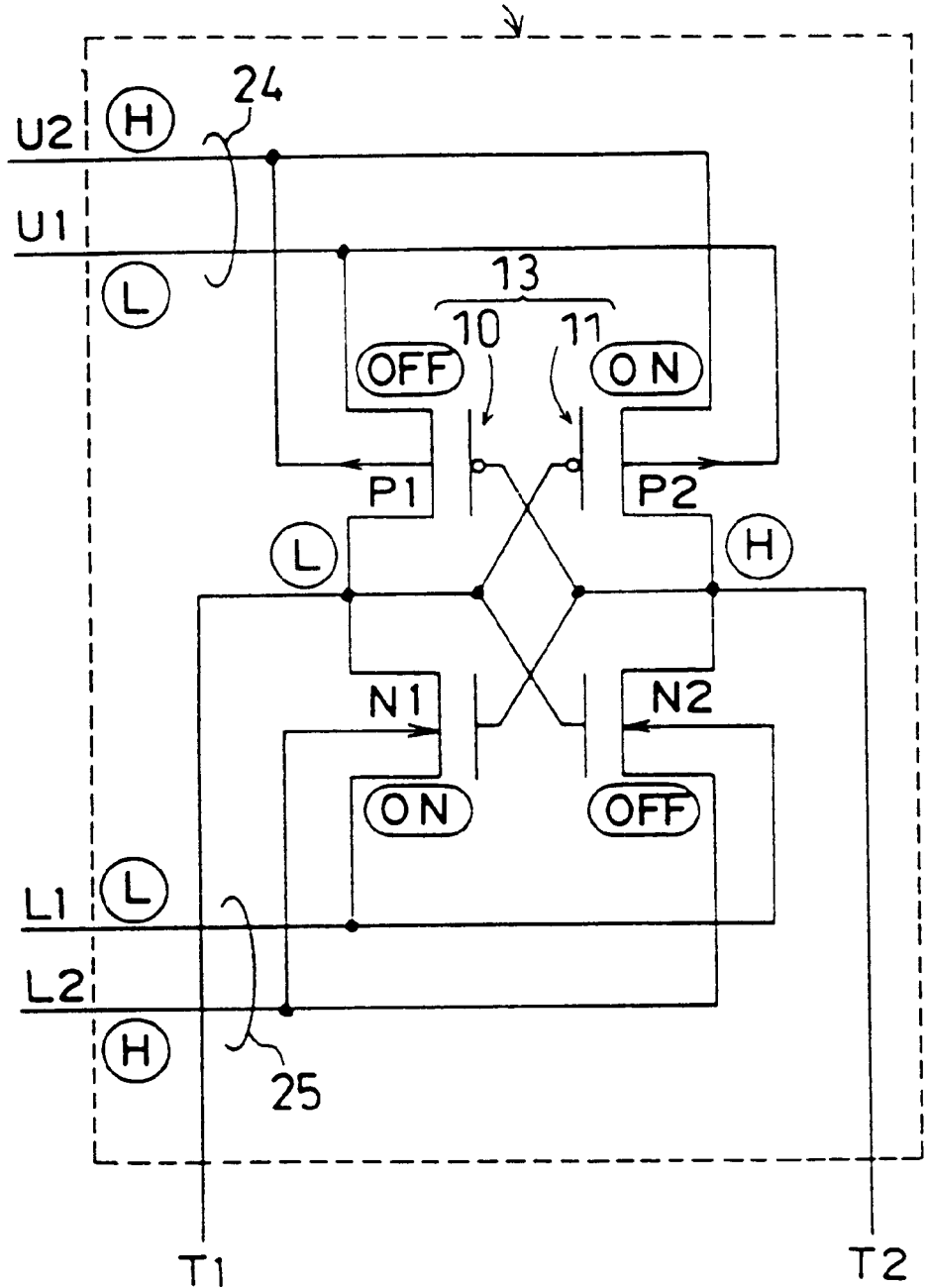
FIG. 9 is a view showing a specific structure of the receiving circuit in the sixth and eighth embodiments of the present invention.

FIG. 9 shows a specific structure of the receiving circuit 26, which is different from the receiving circuit of the first embodiment in that the pair of source electrodes of the PMOS load transistors P1 and P2 of the pair of CMOS inverting circuits 10 and 11 composing the flip-flop circuit 13 are connected directly to the first pair of differential signal lines 24, while the pair of source electrodes of the NMOS transistors N1 and N2 thereof are connected directly to the second pair of differential signal lines 25.

Hence, in the present embodiment, the potentials at the source and gate electrodes of the PMOS transistors P1 and P2 in the flip-flop circuit 13 change in synchronization with the potential changes of the first pair of differential signals U1, U2, as described in the first embodiment, and the potentials at the source and gate electrodes of the NMOS transistors N1 and N2 change in synchronization with the potential changes of the second pair of differential signals L1, L2. Consequently, even when the first and second differential signals have extremely small amplitude voltages lower than the potential at the power source Vcc, the flip-flop circuit 13 operates at a high speed.

Figure 10:
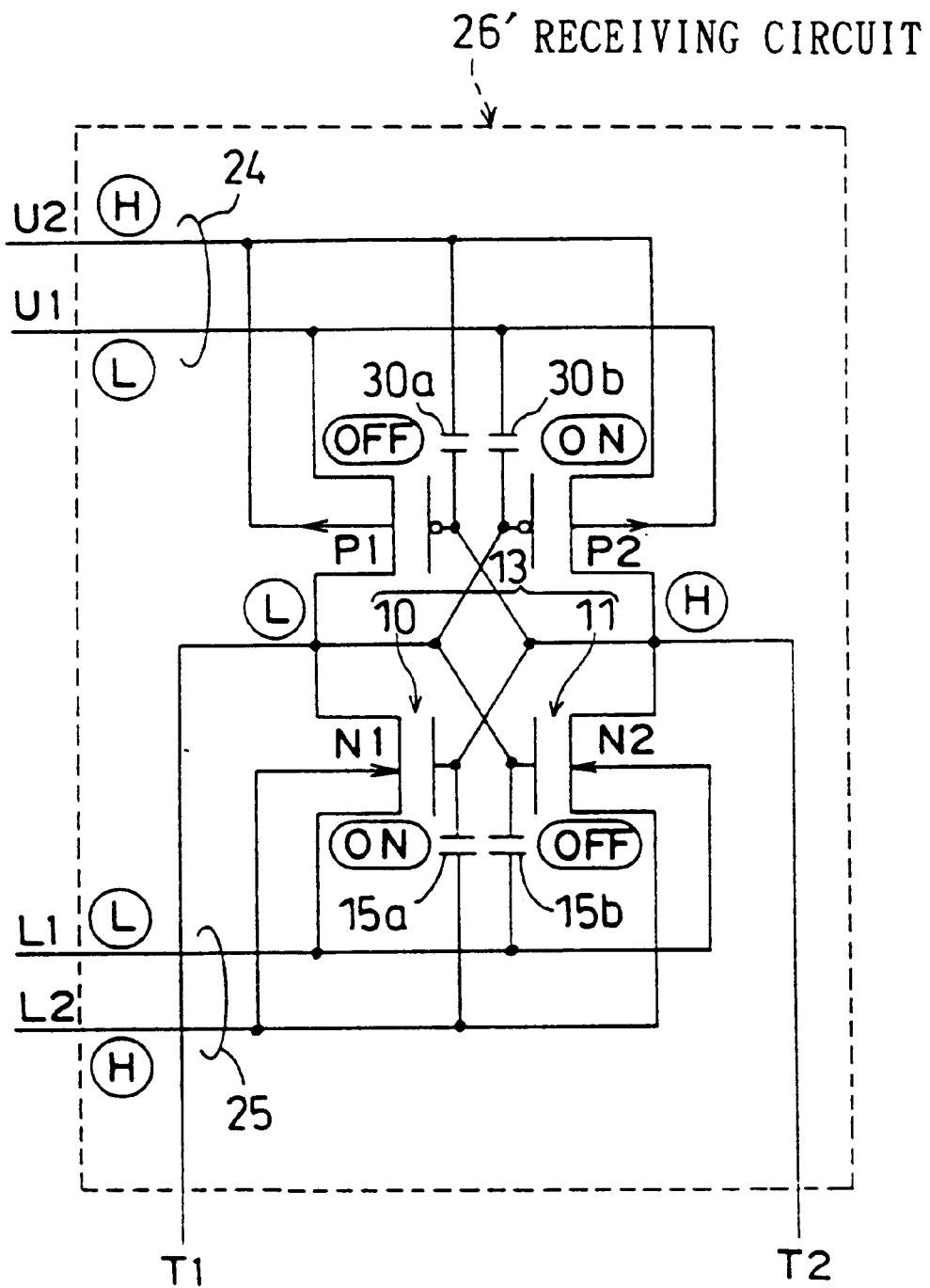
FIG. 10 is a view showing a specific structure of another receiving circuit in the sixth and eighth embodiments of the present invention.

As shown in the receiving circuit 26' of FIG. 10, if the two cross-coupled gate electrode nodes of the pair of CMOS inverting circuits 10 and 11 in the flip-flop 13 are connected to the first and second pairs of differential signal lines 24 and 25 via capacitors 30a, 30b, 15a, and 15b, respectively, the four transistors P1, P2, N1, and N2 operate promptly in response to the potential changes of the first and second pairs of differential signals, so that the potentials at the pair of output terminals T1 and T2 also change at a high speed.

Figure 11:
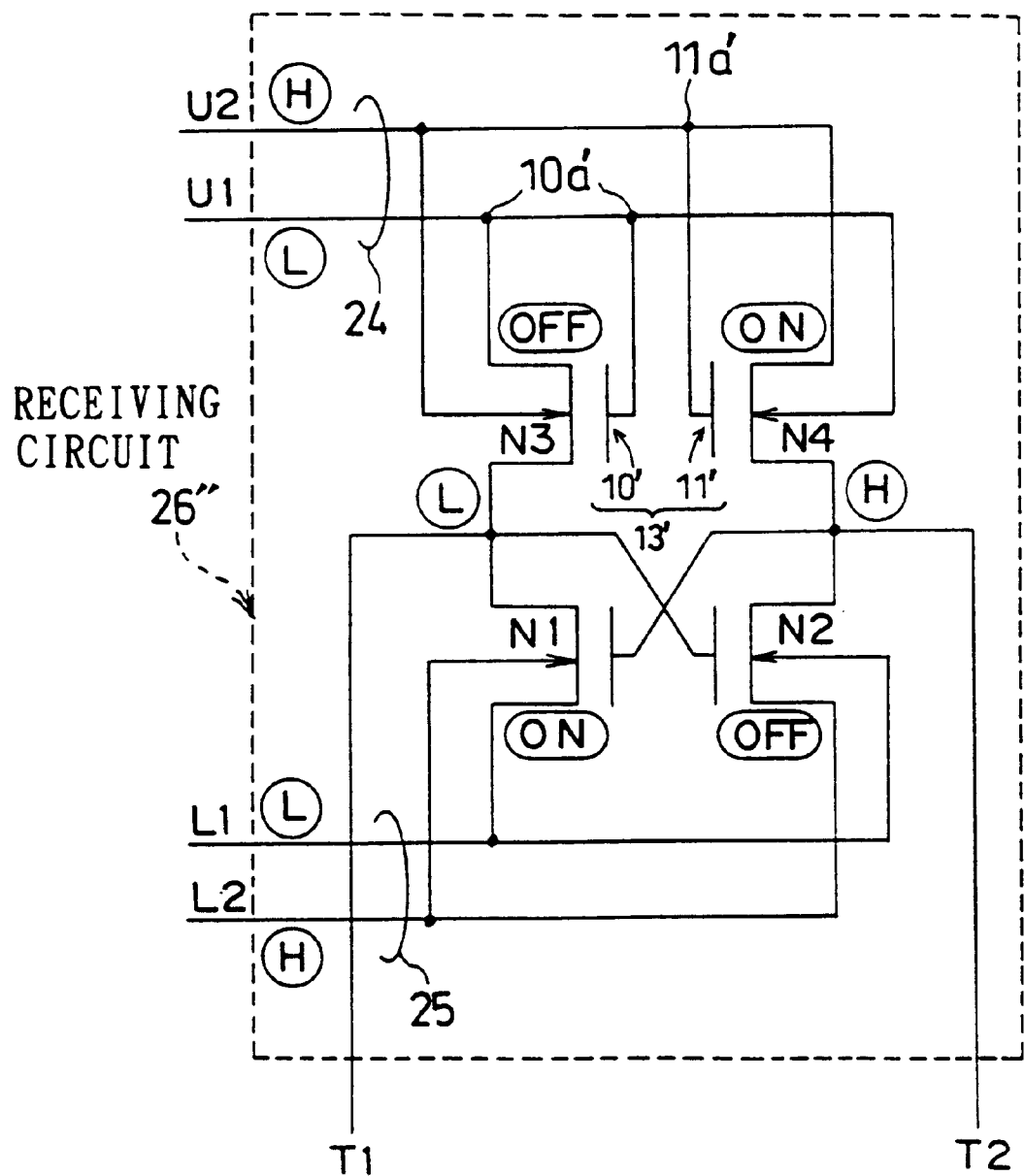
FIG. 11 is a view showing a specific structure of still another receiving circuit in the sixth and eighth embodiments of the present invention.
Figure 12A:
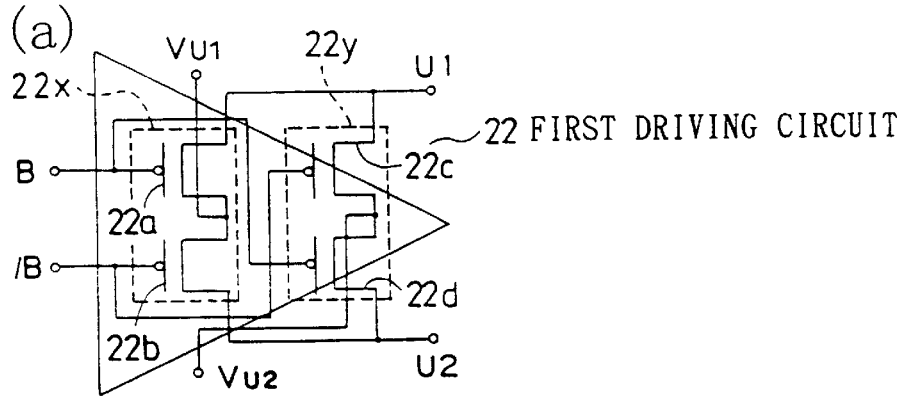
FIG. 12(a) is a view showing a specific structure of a first driving circuit in a ninth embodiment of the present invention.
Figure 12B:
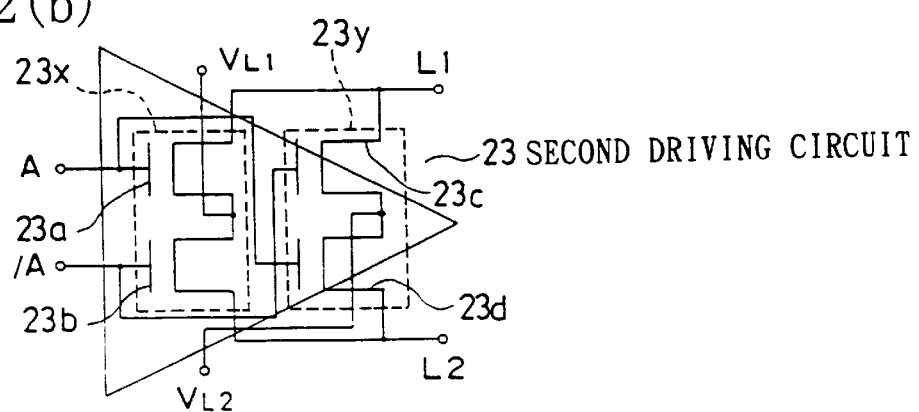
FIG. 12(b) is a view showing a specific structure of a second driving circuit in the ninth embodiment of the present invention.

Alternatively, the receiving circuit may be so constructed that the flip-flop circuit 13' is composed the NMOS inverting circuits 10' and 11' and the diode connection points 10a' and 11a' of the NMOS load transistors N3 and N4 thereof are connected to the first pair of differential signal lines 24, as shown in a receiving circuit 26" of FIG. 11.

It is to be noted that a desired signal transmitting/receiving circuit can also be implemented by variously combining the first to sixth embodiments described above.

Seventh Embodiment

Below, a seventh embodiment of the present invention will be described with reference to FIGS. 5 and 7.

The present embodiment is characterized in that a pair of differential signals are inputted to the respective substrate electrodes of the pair of MOS transistors composing the receiving circuit to control the impedance of each of the MOS transistors. In other words, in contrast to the foregoing first to sixth embodiments in which the potential changes of the differential signals are detected at a high speed by transmitting the change of the differential signals to the gate and source electrodes of the transistors and thereby enhancing the potential change between the two electrodes, the present embodiment uses the potential change between the substrate and source electrodes as well as the potential change between the gate and source electrodes to detect the potential changes of the differential signals.

Specifically, in the receiving circuit 4" shown in FIG. 5, the respective pairs of substrate electrodes of the pairs of PMOS transistors P1 and P2 and P3 and P4 are directly cross-coupled to the pair of source electrodes U1 and U2 of the PMOS transistors P1 and P2. On the other hand, the respective pairs of substrate electrodes of the pairs of NMOS transistors N1 and N2 and N5 and N6 are directly cross-coupled to the pair of signal lines 3 for the differential signals L1, L2 based on the ground potential. In the receiving circuit 4"" shown in FIG. 7, the pair of substrate electrodes of the pair of NMOS load transistors N3 and N4 composing the flip-flop circuit 13' are directly cross-coupled to the pair of source electrodes U1 and U2 of the NMOS transistors N3 and N4 composing the flip-flop circuit 13'.

With the arrangement, the present embodiment controls the substrate bias of each of the MOS transistors composing the receiving circuit based on the potential difference and impedance difference between the pair of differential signal lines 3, so that it becomes possible to control the threshold voltage of each of the MOS transistors, which enables impedance control responsive to the potential changes of the differential signals L1, L2.

Eighth Embodiment

Below, an eighth embodiment of the present invention will be described with reference to FIGS. 3 to 7 and FIGS. 9 to 11.

Figure 7:
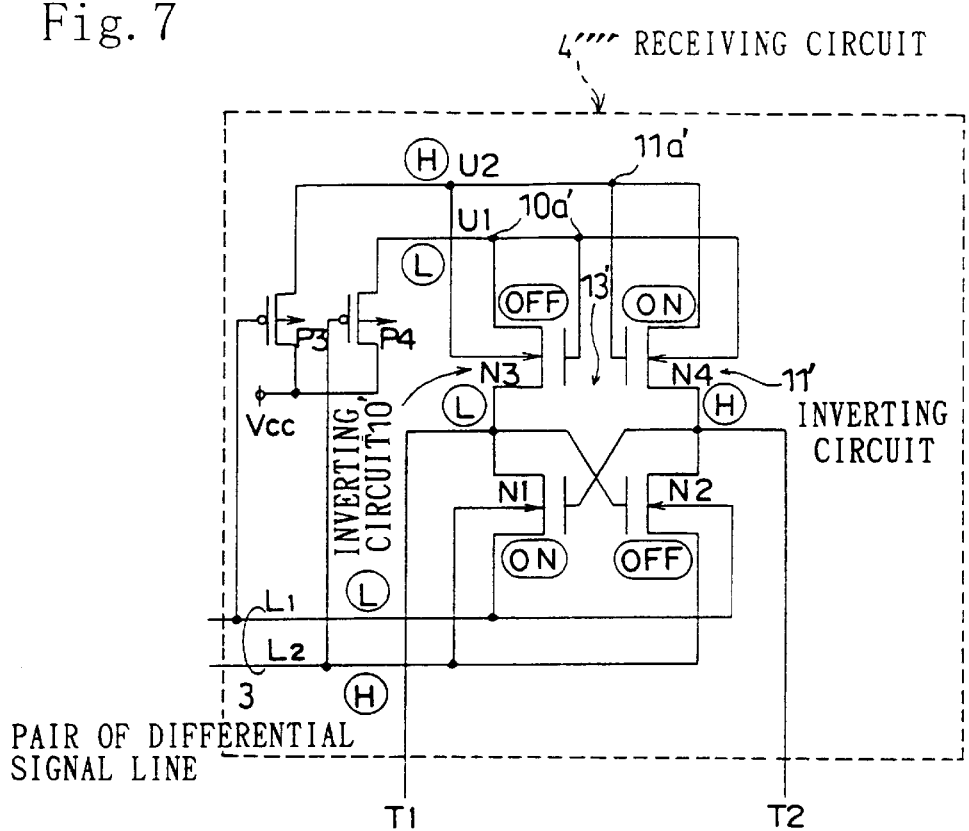
FIG. 7 is a view showing a specific structure of the receiving circuit in a fifth embodiment, the seventh embodiment, and the eighth embodiment of the present invention.

The present embodiment is characterized in that, in each of the receiving circuits shown in FIGS. 3 to 6 and FIGS. 9 and 10, the threshold voltage of the pair of PMOS load transistors P1 and P2 of the pair of inverting circuits is adjusted to be lower than the threshold voltage of the other PMOS transistors formed on the same chip and that, in each of the receiving circuits shown in FIGS. 7 and 11, the threshold voltage of the pair of NMOS transistors N3 and N4 of the pair of inverting circuits is adjusted to be lower than the threshold voltage of the other NMOS transistors formed on the same chip.

With the arrangement, the delay of the output change responsive to the potential changes of the differential signals is minimized, though the LOW level at the pair of output terminals T1 and T2 of the receiving circuit is slightly increased (potential increase). Hence, the present embodiment is particularly effective in the case where the power source Vcc has a small voltage of about 1 V or less.

Ninth Embodiment

Below, a ninth embodiment of the present invention will be described with reference to FIGS. 12 to 15.

The present embodiment provides a signal transmitting circuit for transmitting a pair of differential signals to the receiving circuit of each of the sixth to eighth embodiments described above.

FIGS. 12($a$) and 12($b$) show a specific structure of the driving circuits 22 and 23 of the sixth embodiment shown in FIG. 8. In FIG. 12($a$), the driving circuit 22 is composed of a first push-pull circuit 22$x$ consisting of two PMOS transistors 22$a$ and 22$b$ and a second push-pull circuit 22$y$ consisting of two PMOS transistors 22$c$ and 22$d$. As shown in FIG. 13, the driving circuit 22 generates a first pair of differential signals U1, U2 having a small amplitude and a potential in the vicinity of the power-source potential Vcc by using the power-source potential Vcc as a reference voltage. In FIG. 12($b$), the driving circuit 23 is similarly composed of first and second push-pull circuits 23$x$ and 23$y$ consisting of four NMOS transistors 23$a$ to 23$d$ and generates a second pair of differential signals L1, L2 having a small amplitude and a potential in the vicinity of the ground potential Vss by using the ground potential Vss as a reference voltage, as shown in FIG. 13.

In FIG. 12($a$) are shown respective power sources VU1 and VU2 for the HIGH and LOW levels of the differential signals U1, U2. The power source VU1 for the HIGH level is the power source Vcc and the potential difference therebetween is equal to the second amplitude voltage dV1 shown in FIG. 13. In FIG. 12($b$) are shown respective power sources VL1 and VL2 for the HIGH and LOW levels of the differential signals U1, U2. The power source VL2 for the LOW level is a ground power source and the potential difference therebetween is equal to the third amplitude voltage dV2 shown in FIG. 13.

Figure 14:
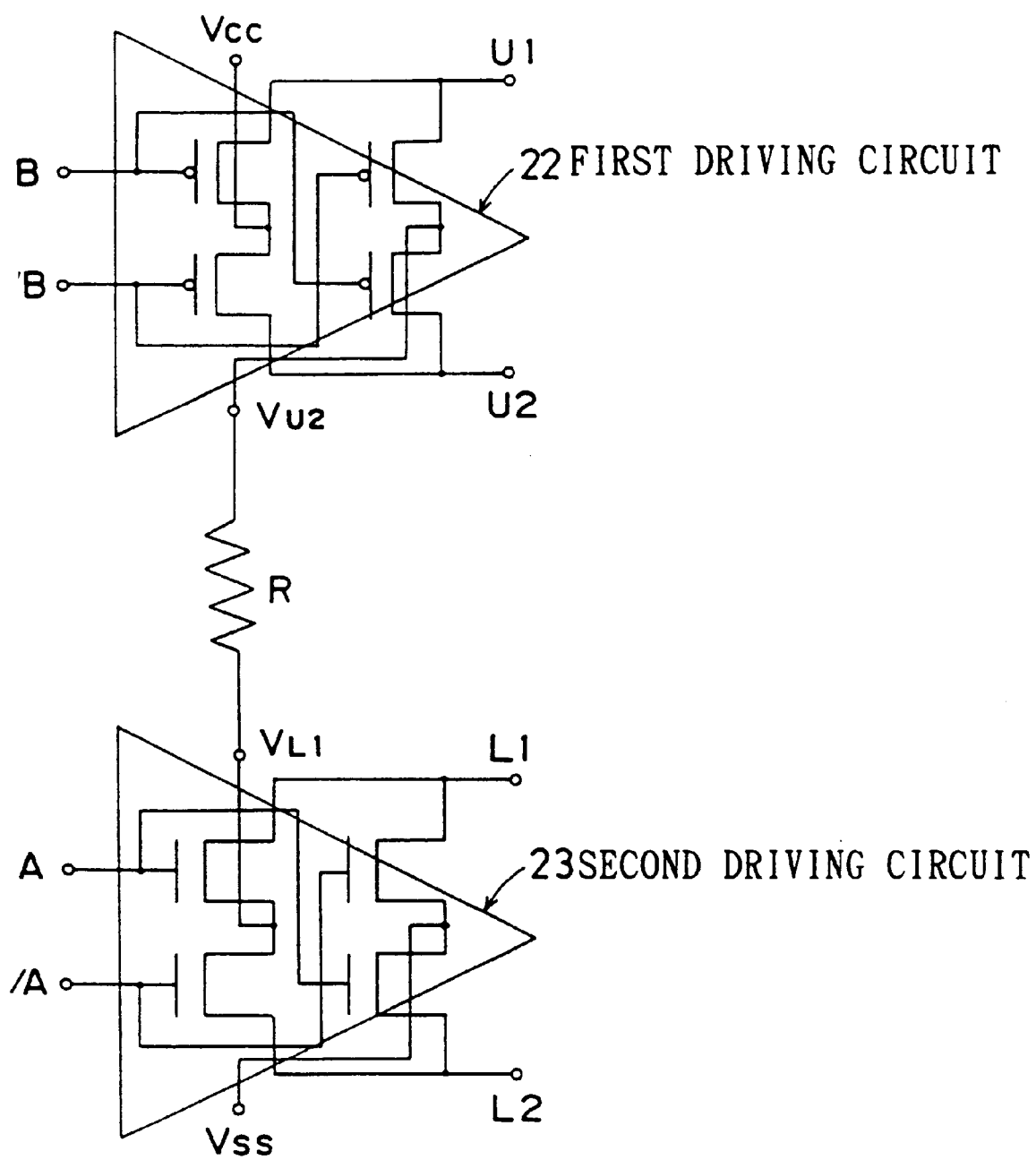
FIG. 14 is a view showing a specific structure of another driving circuit in the ninth embodiment of the present invention.

FIG. 14 shows a structure for generating the power sources VU2 and VL1.

The structure shown in FIG. 14 is based on resistance division. The amplitude voltage (second amplitude voltage) dV1 of the first pair of differential signals U1, U2 and the amplitude voltage (third amplitude voltage) dV2 of the second pair of differential signals L1, L2 are implemented between the power-source potential Vcc and the ground potential Vss. Hence, if the first and second driving circuits 22 and 23 and an inserted resistor R are connected in series between the power source Vcc and the ground Vss, VU1=Vcc VU2=Vcc−dV1

VL1=VSS+dV2

VL2=Vss are satisfied. Since the extremely small voltages dV1 and dV2 are determined by voltage division by the resistances of the switches composing the first and second driving circuits 22 and 23 and the inserted resistor R, the extremely small voltages dV1 and dV2 are reduced as the inserted resistor R is increased.

Figure 15:
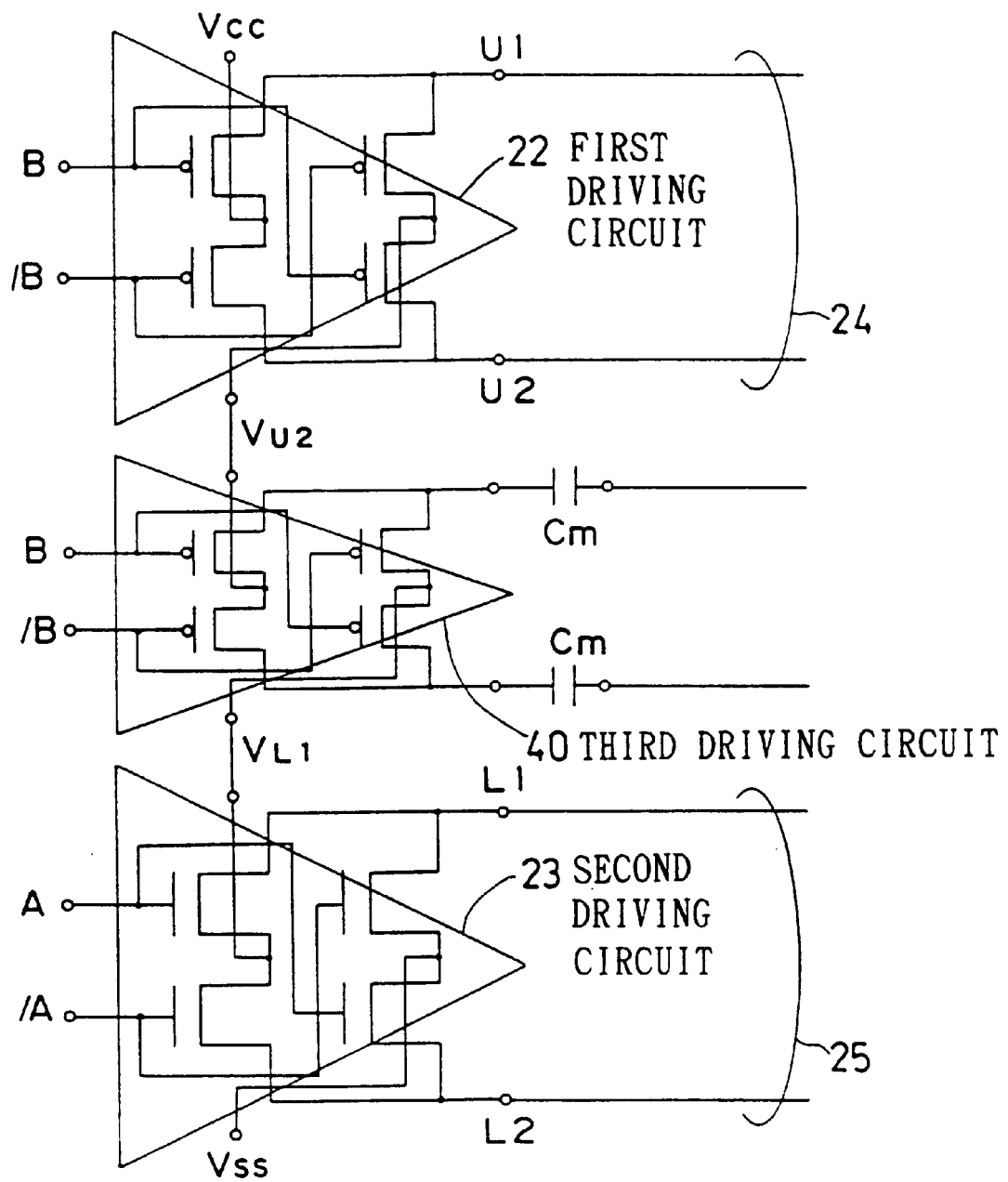
FIG. 15 is a view showing a specific structure of still another driving circuit in the ninth embodiment of the present invention.

FIG. 15 shows another structure for generating the power sources VU2 and VL1, which is based on capacitance division.

In the structure shown in FIG. 15, a third driving circuit 40 is interposed between the first and second driving circuits 22 and 23 such that the first, third, and second driving circuits 22, 40, and 23 are connected in series between the power source Vcc and the ground Vss.

The third interposed driving circuit 40 has the same configuration as either one of the first and second driving circuits 22 and 23 (in the drawing, the first driving circuit 22) and a pair of outputs connected to a dummy capacitor Cm. The dummy capacitor Cm is adjusted to have a capacitance smaller than the stray capacitance of the first and second pairs of differential signal lines 24 and 25. In this case, the potentials at the power sources VU1 and VL1 are determined by voltage division by the capacitance of the dummy capacitor Cm and the wiring capacitance of the first and second pairs of differential signal lines 24 and 25, which in turn determine the extremely small voltages dV1 and dV2.

When the first driving circuit 22 releases charges accumulated in the first pair of differential signal lines 24 in the structure based on capacitance division shown in FIG. 15, the released charges are reused concurrently by the driving circuit 23 via the dummy capacitor Cm to charge up the second pair of differential signal lines 25. Thus, when the first and second driving circuits 22 and 23 are driven, one of the driving circuits is operated with the charge released from the other, so that the current consumed by one of the driving circuits becomes substantially zero. Hence, there can be provided a signal receiving circuit having a high tracking speed or a reduced clock skew, while consuming lower power.

Tenth Embodiment

Figure 16:
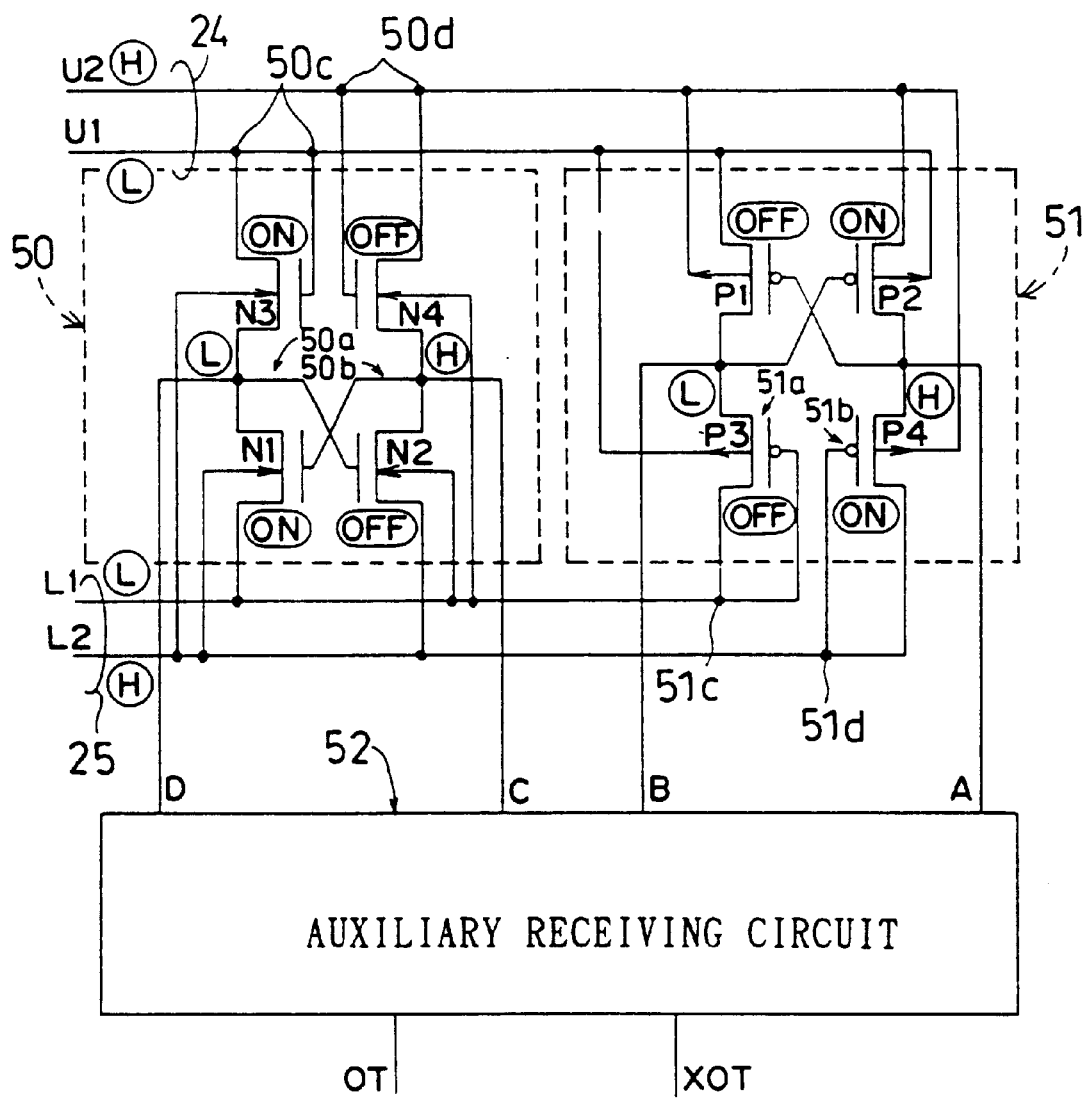
FIG. 16 is a view showing a specific structure of the receiving circuit in a tenth embodiment of the present invention.

Below, a tenth embodiment of the present invention will be described with reference to FIGS. 16, 17(a), 17(b), 18(a) and 18(b). In FIG. 16 are shown: a first flip-flop circuit 50 composed of the NMOS transistors shown in FIG. 11 depicting the sixth embodiment; a second flip-flop circuit 51 similarly composed of the PMOS transistors; and an auxiliary receiving circuit for receiving outputs A to D from the first and second flip-flop circuits 50 and 51.

The first flip-flop circuit 50 is composed of first and second NMOS inverting circuits 50a and 50b connected in a flip-flop manner. The respective NMOS load transistors N3 and N4 of the inverting circuits 50a and 50b have diode connection points 50c and 50d between the respective gate and source electrodes thereof. The pair of NMOS transistors N1 and N2 of the pair of inverting circuits 50a and 50b have a pair of source electrodes connected to the second pair of differential signal lines 25. The diode connection points 50c and 50d of the pair of load transistors N3 and N4 are connected to the first pair of differential signal lines 24.

The second flip-flop circuit 51 is composed of first and second PMOS inverting circuits 51a and 51b connected in a flip-flop manner. The respective PMOS load transistors P3 and P4 of the inverting circuits 51a and 51b have diode connection points 51c and 51d between the respective gate and drain electrodes thereof. The pair of PMOS transistors P1 and P2 of the pair of inverting circuits 51a and 51b have a pair of source electrodes connected to the first pair of differential signal lines 24. The diode connection points 51c and 51d of the pair of load transistors P3 and P4 are connected to the second pair of differential signal lines 25.

Figure 18A:
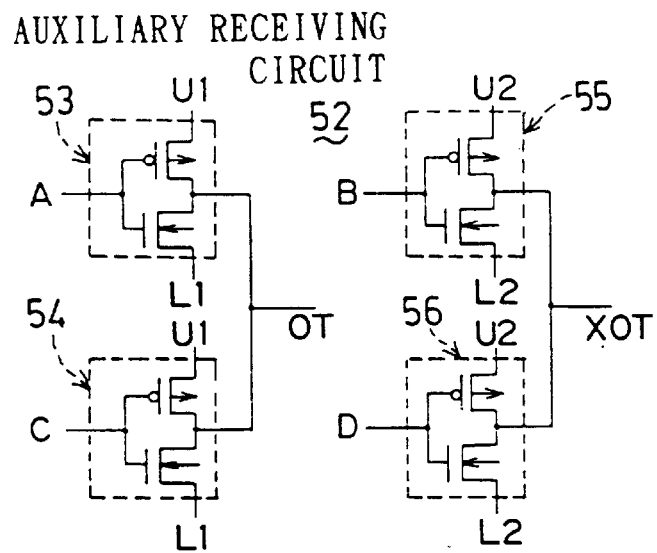
FIG. 18(a) is a view showing a specific internal structure of an auxiliary receiving circuit in the tenth embodiment of the present invention.

FIG. 18(a) shows the internal structure of the auxiliary receiving circuit 52, which has first to fourth CMOS inverting circuits 53 to 56. The first and second inverting circuits 53 and 54 have a common output terminal OT and use one (in the drawing, the line for transmitting the differential signal U1) of the first pair of differential signal lines 24 as a predetermined power source and one (in the drawing, the line for transmitting the differential signal L1) of the second pair of differential signal lines 25 as a ground power source, respectively. The first inverting circuit 53 receives one A of signals from the pair of outputs of the second flip-flop circuit 51. The second inverting circuit 54 receives one C of signals from the pair of outputs of the first flip-flop circuit 50. On the other hand, the third and fourth inverting circuits 55 and 56 have a common output terminal XOT and use the other (in the drawing, the line for transmitting the differential signal U2) of the first pair of differential signal lines 24 as a predetermined power source and the other (in the drawing, the line for transmitting the differential signal L2) of the second pair of differential signal lines 25 as a ground power source, respectively. The third inverting circuit 55 receives the other B of the signals from the pair of outputs of the second flip-flop circuit 51. The fourth inverting circuit 56 receives the other D of the signals from the pair of outputs of the first flip-flop circuit 50.

Figure 17A:
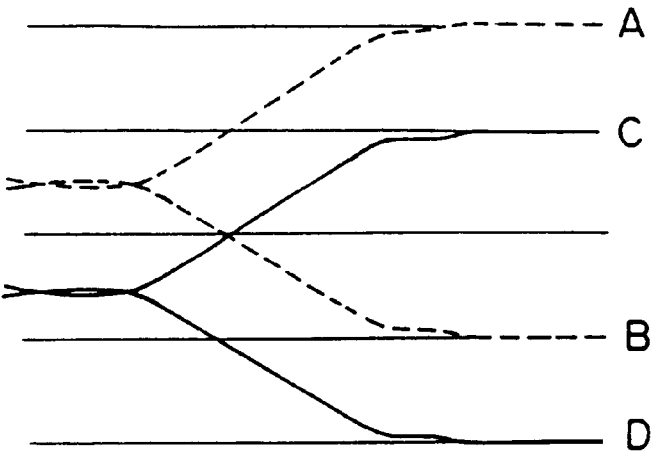
FIGS. 17(a) and 17(b) are a timing chart of the receiving circuit in the tenth embodiment of the present invention.
Figure 17B:
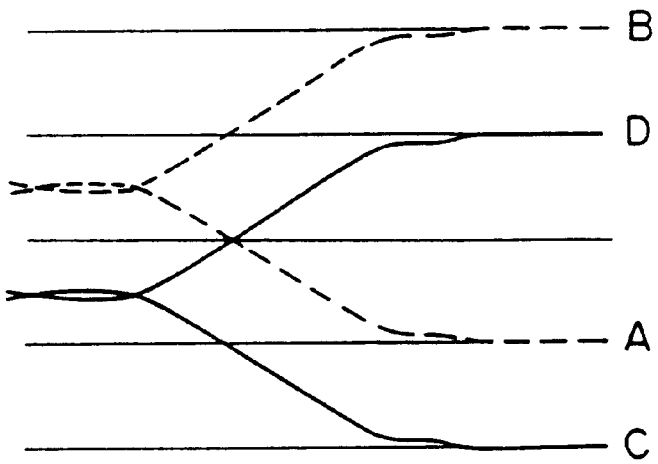

FIGS. 17(a) and 17(b) show potential variations at the pair of outputs A and B of the first flip-flop circuit 50 and at the pair of outputs C and D of the second flip-flop circuit 51 in the present embodiment. At the time t=t0 shown in FIG. 17(a) and at the time t=t1 shown in FIG. 17(b), the potential levels of the pair of outputs are switched. It is to be noted that, in FIG. 17(a), the output B on the LOW level is higher than the ground potential and the output C on the HIGH level is lower than the power-source potential. In FIG. 17(b), on the other hand, the output A on the LOW level is higher than the ground potential and the output D on the HIGH level is lower than the power-source potential. This is because the inverting circuits connected in a flip-flop manner are of diode load type. Accordingly, a through current flows when the outputs of the inverting circuits is connected to a mere logic circuit, resulting in unstable operation.

To prevent the through current from flowing, the auxiliary receiving circuit 52 shown in FIG. 18(a) is provided in the present embodiment.

Figure 18B:
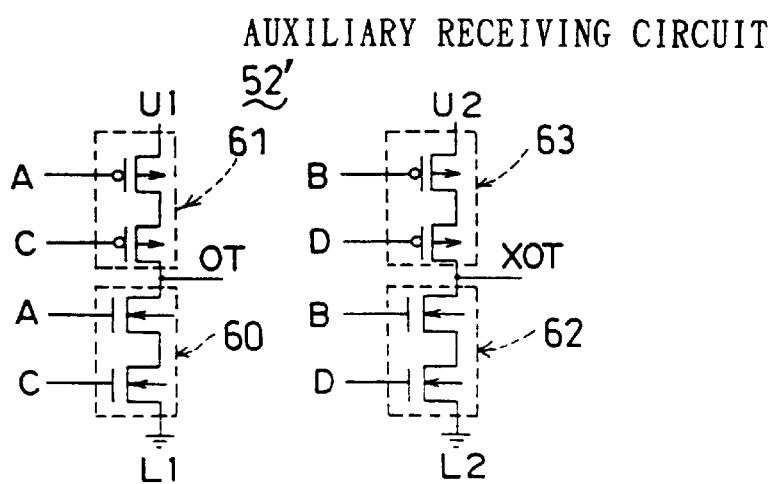
FIG. 18(b) is a view showing a variation of the auxiliary receiving circuit.

FIG. 18(b) shows a variation of the auxiliary receiving circuit, which has two pairs of inverting circuits, each pair connected in series.

As shown in the drawing, an auxiliary receiving circuit 52' has a pair of NMOS inverting circuit 60 and a PMOS inverting circuit 61 and another pair of NMOS inverting circuit 62 and a PMOS inverting circuit 63. The pair of NMOS inverting circuit 601 and PMOS inverting circuit 61 are connected in series to form a series circuit with a series connection point serving as the output terminal OT. The series circuit uses one (in the drawing, U1) of the first pair of differential signals U1, U2 and one (in the drawing, L1) of the second pair of differential signals L1, L2 as a power source and a ground power source, respectively. In each of the inverting circuits 60 and 61, a signal from one C of the pair of outputs of the first flip-flip circuit 50 and a signal from one A of the pair of outputs of the second flip-flop circuit 51 are inputted to the gates.

The other pair of NMOS inverting circuit 62 and PMOS inverting circuit 63 have the same configuration. That is, the two inverting circuits 63 and 64 are connected in series to form a series circuit with a series connection point serving as the output terminal XOT. The series circuit uses the other U2 of the first pair of differential signals and the other L2 of the second pair of differential signals as a power source and a ground power source, respectively. In each of the inverting circuits 62 and 63, a signal from the other output D of the first flip-flop circuit 50 and a signal from the other output B of the second flip-flop circuit 51 are inputted to the gates.

Eleventh Embodiment

Below, a description will be given to an eleventh embodiment of the present invention with reference to FIGS. 19 and 20. In place of the flip-flop circuits used to compose the signal receiving circuits described above, the present embodiment uses an inverting circuit to compose a signal receiving circuit.

Figure 19:
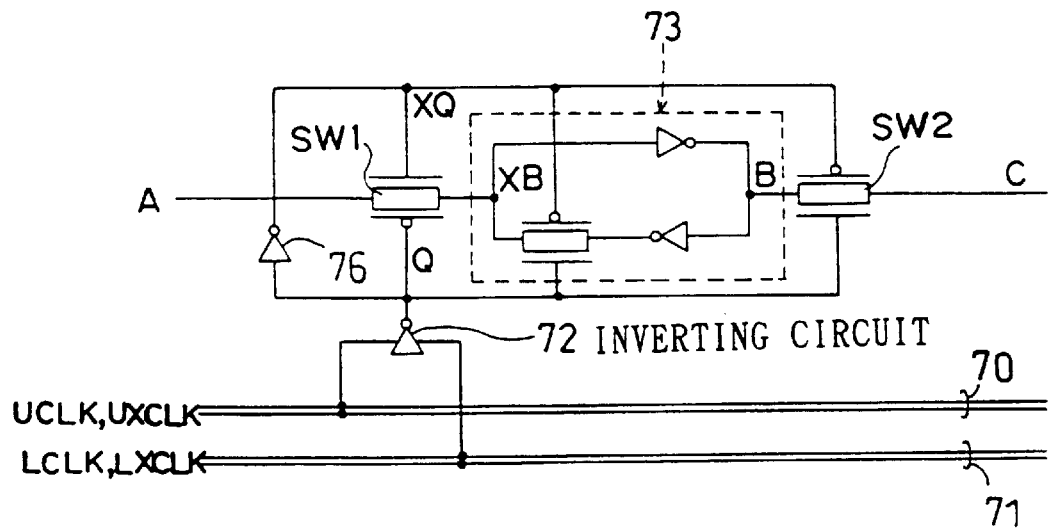
FIG. 19 is a schematic view showing the overall structure of a semiconductor integrated circuit in an eleventh embodiment.

FIG. 19 shows a semiconductor integrated circuit including the signal receiving circuit according to the present invention. In the drawing are shown: a first pair of differential signal lines 70 for transmitting a pair of differential clock signals UCLK, UXCLK having a small amplitude voltage (equal to or lower than one half of a power-source voltage) based on the power-source potential Vcc, which have been outputted from the first driving circuit 22 shown in FIGS. 8 and 12; and a second pair of differential signal lines 71 for transmitting a pair of differential clock signals LCLK and LXCLK having a small amplitude voltage (equal to or lower than one half of the power-source voltage) based on the ground potential Vss, which have been outputted from the second driving circuit 23 shown in FIGS. 8 and 12(a) and 12(b).

There are also shown: an inverting circuit 72 for receiving the differential clock signals from the first and second pairs of differential signal lines 70 and 71 and generating a clock signal Q having an amplitude voltage larger than those of the differential clock signals; a first switch circuit SW1 which is activated on the falling edge of the clock signal Q from the inverting circuit 72; a latch circuit 73 for receiving data A via the first switch circuit SW1 when it is activated and latching the received data A on the rising edge of the clock signal Q from the inverting circuit 72; another inverting circuit 76 for inverting the clock signal Q from the inverting circuit 72; a second switch circuit SW2 which is activated on the falling edge of an inversion clock signal /Q from the other inverting circuit 76 to output the data latched by the latch circuit 73.

Figure 20:
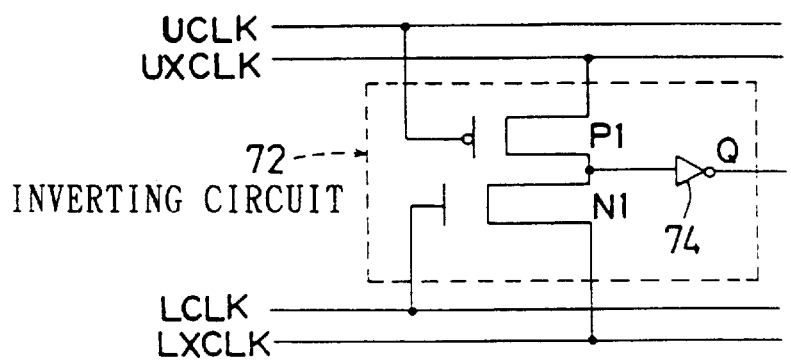
FIG. 20 is a view showing a specific structure of a receiving circuit of the semiconductor integrated circuit in the eleventh embodiment.

FIG. 20 shows a specific structure of the inverting circuit (signal receiving circuit) 72 composed of a CMOS inverting circuit. The CMOS inverting circuit 72 is composed of a PMOS transistor P1 and an NMOS transistor N1 having a source electrode connected to the drain electrode of the transistor P1. To the connection point between the two transistors P1 and N1, there is further connected an inverting circuit 74. An output from the inverting circuit 74 serves as the clock signal Q. The gate and source electrodes of the PMOS transistor P1 receive the first pair of differential clock signals UCLK and UXCLK, respectively. On the other hand, the gate and source electrodes of the NMOS transistor N1 receive the second pair of differential clock signals LCLK and LXCLK, respectively. Accordingly, when the PMOS transistor P1 is in the ON state, one UXCLK of the first pair of differential signals is outputted to the inverting circuit 74, while one LXCLK of the second pair of differential clock signals is outputted to the inverting circuit 74 when the NMOS transistor N1 is in the ON state. Hence, the amplitude voltage of the clock signal (detection signal) Q outputted from the inverting circuit 74 has a value in the vicinity of the difference between the power-source potential Vcc and the ground potential Vss.

In the foregoing structure, the respective gate and source electrodes of the two MOS transistors P1 and N1 composing the inverting circuit 72 receive the differential clock signals so that, when the potentials of the differential clock signals change, the potentials at the gate and source electrodes shift in opposite directions in synchronization with the potential changes. Consequently, the potential differences between the respective gate and source electrodes form negative voltages (i.e., the gate and source electrodes are reverse-biased by the value of the potential difference between the differential clock signals) when the MOS transistors P1 and N1 are turned OFF, so that the MOS transistors P1 and N1 are cut off completely even when a threshold voltage is lower than 0 V. This ensures static reception of the differential clock signals UCLK, UXCLK, LCLK, and LXCLK to be transmitted even when the amplitude voltages thereof are extremely small, so that the current consumed by the semiconductor integrated circuit is reduced accordingly because the differential clock signals of extremely small amplitudes are transmitted.

Figure 21:
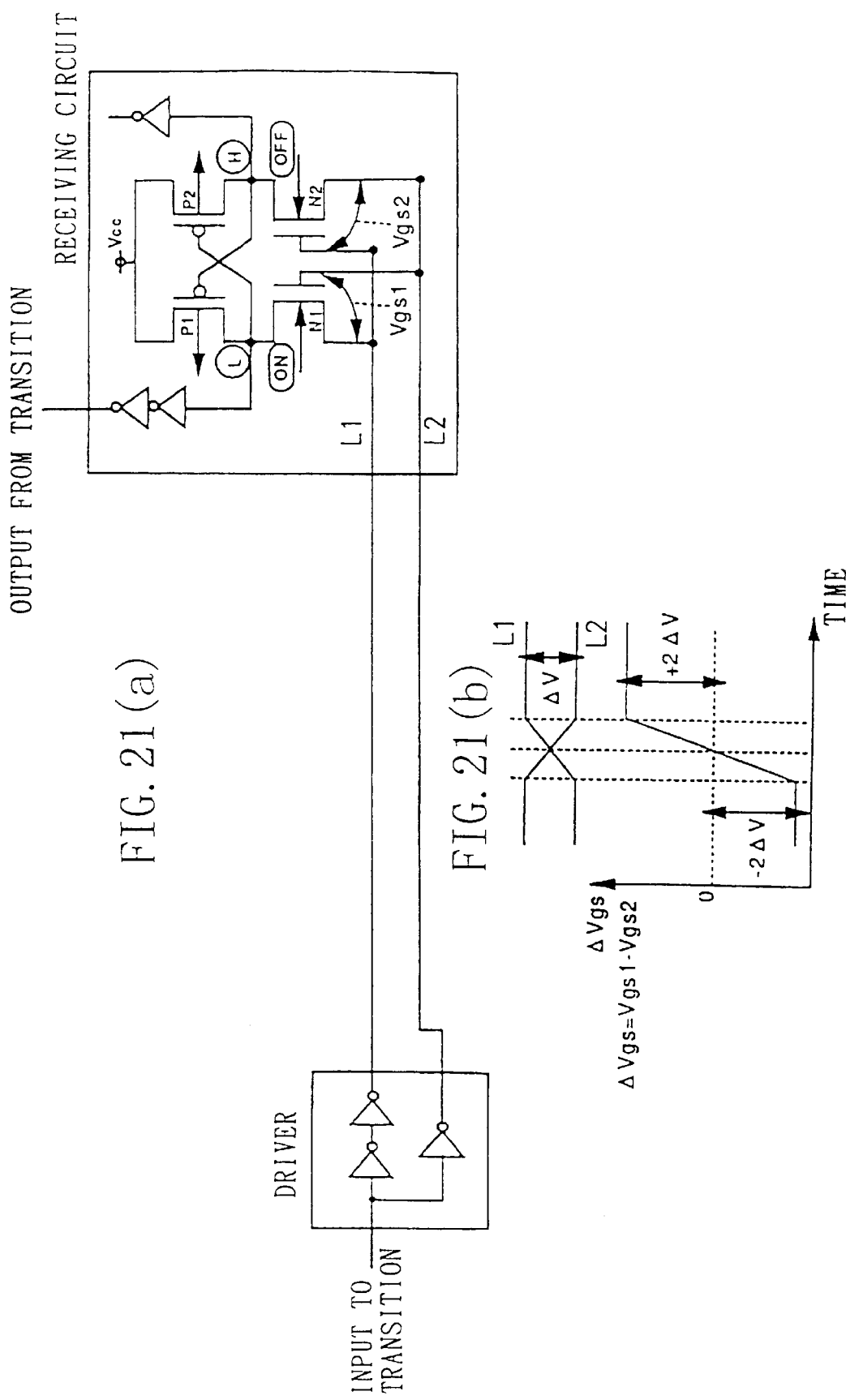
FIG. 21(a) is a view showing the overall structure of the eleventh embodiment of the present invention.
FIG. 21(b) is a view showing a difference in gate-to-source voltage between two NMOS transistors partially composing the receiving circuit in the eleventh embodiment.
Figure 35A:
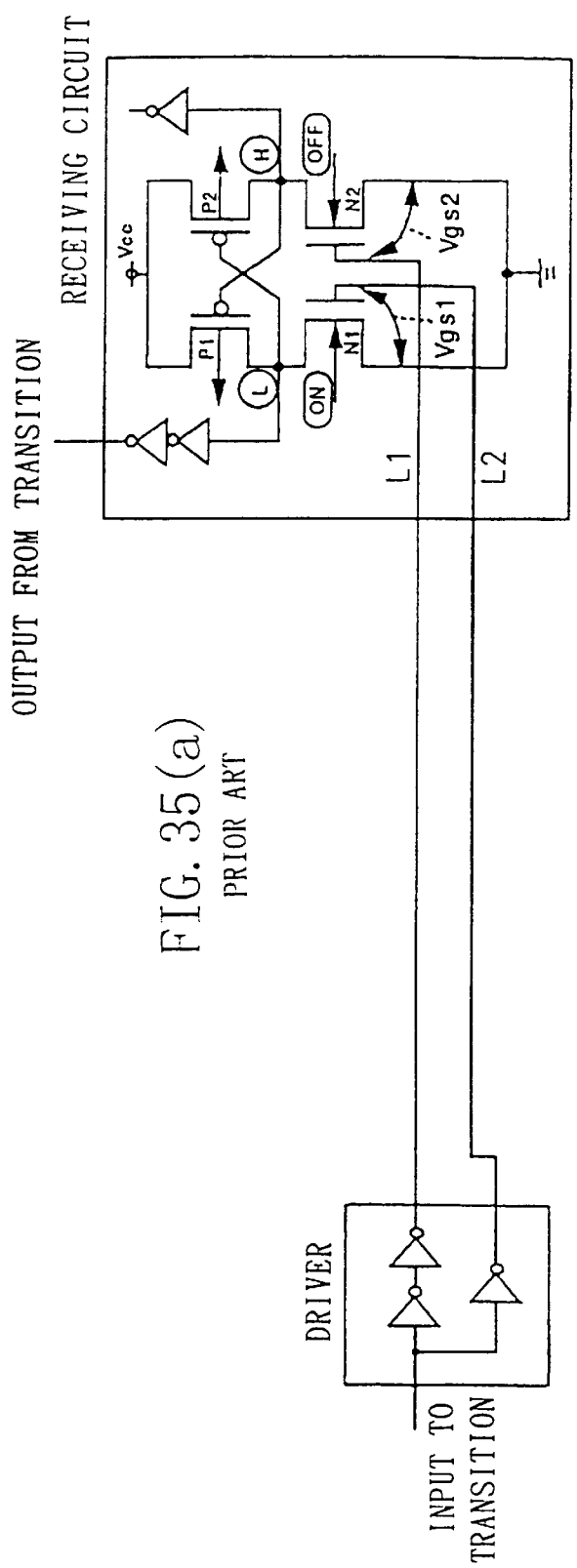
FIG. 35(a) is a view showing the overall structure of another conventional semiconductor integrated circuit.
Figure 35B:
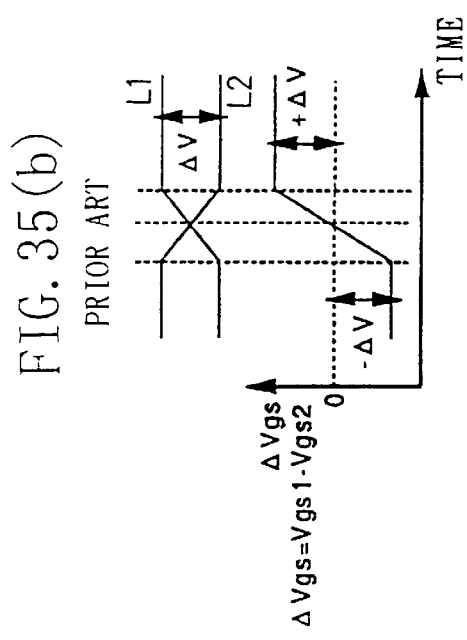
FIG. 35(b) is a view showing the difference in gate-to-source voltage between two NMOS transistors partially composing a receiving circuit in the conventional semiconductor integrated circuit of FIG. 35(a).

In the conventional structure shown in FIG. 35(a), the gate electrodes of the NMOS transistors N1 and N2 partially composing the receiving circuit receive the pair of differential signals L1, L2, while the respective source electrodes thereof are grounded with potentials fixed at the ground potential, so that the difference ΔVgs (=Vgs1−Vgs2) between the gate-to-source voltage Vgs1 of the NMOS transistor N1 and the gate-to-source voltage Vgs2 of the NMOS transistor N2 cannot be larger than the potential difference between the pair of differential signals L1, L2, as shown in FIG. 35(b). In the present embodiment, by contrast, potentials at the respective source electrodes of the NMOS transistors N1 and N2 change in a direction opposite to the direction of potential changes at the gate electrodes thereof as shown in FIG. 21(a), so that the difference ΔVgs between the gate-to-source voltage Vgs1 of the NMOS transistor N1 and the gate-to-source voltage Vgs2 of the NMOS transistor N2 can be doubled compared with the conventional structure of FIG. 35, as shown in FIG. 21(b). Accordingly, there can be achieved higher-speed operation and a reduced delay time.

Figure 22:
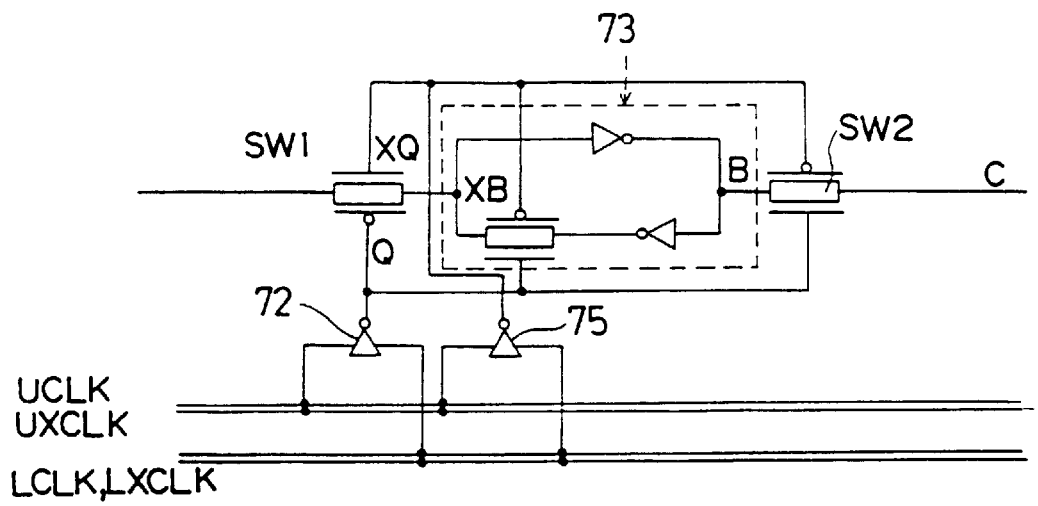
FIG. 22 is a schematic view showing the overall structure of another semiconductor integrated circuit in the eleventh embodiment of the present invention.
Figure 23:
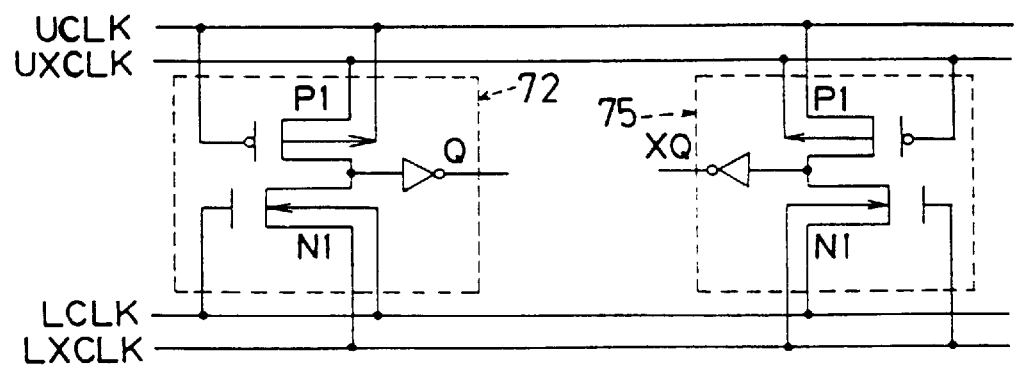
FIG. 23 is a view showing a specific structure of the receiving circuit of the other semiconductor integrated circuit in the eleventh embodiment of the present invention.

FIGS. 22 and 23 show a variation of the inverting circuit, in which is provided another inverting circuit 75 in addition to the inverting circuit 72 shown in FIG. 20. As shown in FIG. 23, the connecting relationships between the gate and source electrodes of each of the MOS transistors and the differential clock signals in the inverting circuit 72 are complementary to those established in the inverting circuit 72.

The variation has thus eliminated the need for the inverting circuit 76 that inverts the clock signal Q for the inverting circuit 72 in FIG. 19. The present embodiment is particularly effective in such an application that a delay time resulting from the inverting circuit 76 presents a problem.

Twelfth Embodiment

Figure 24:
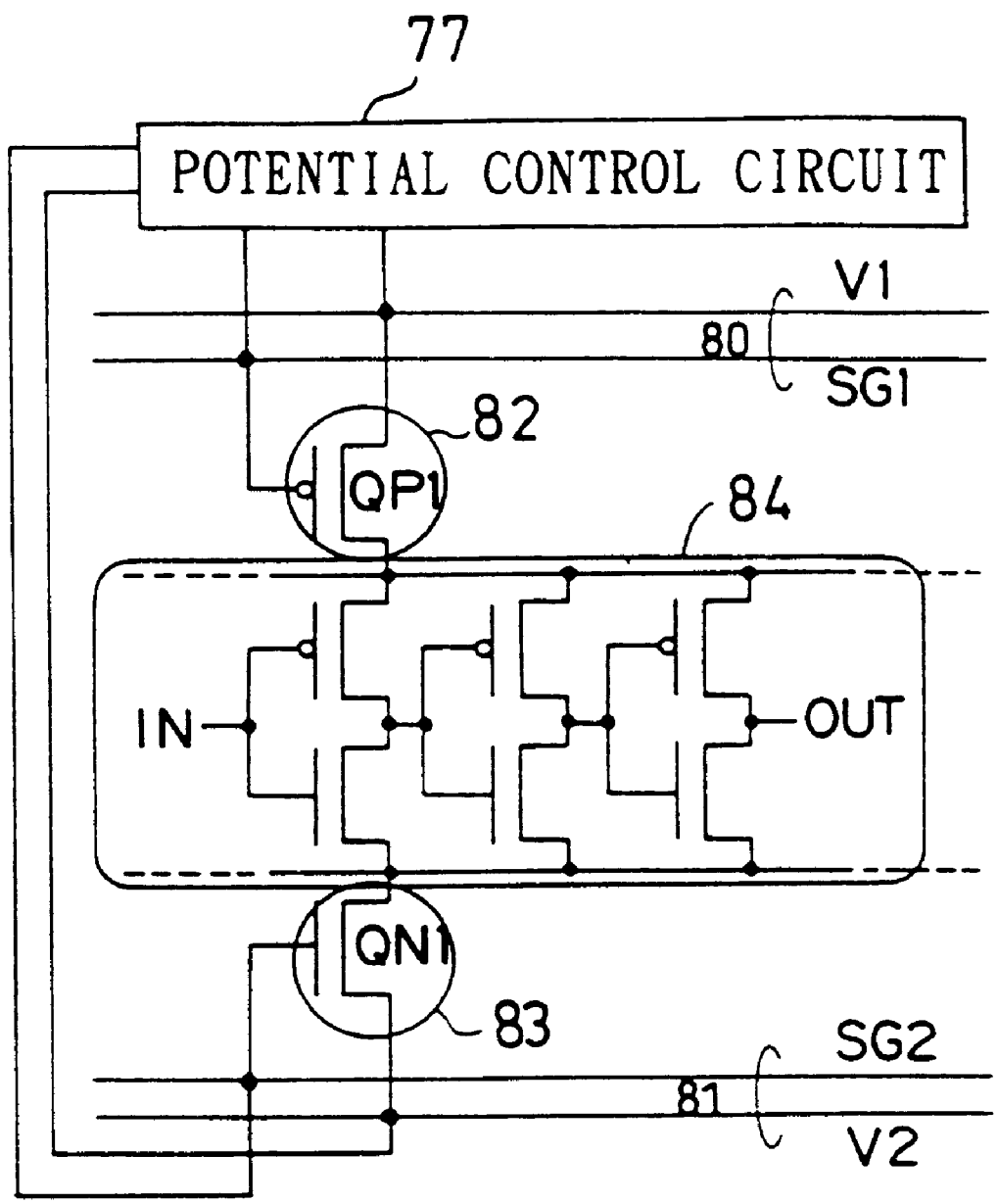
FIG. 24 is a view showing a specific structure of the semiconductor integrated circuit in a twelfth embodiment of the present invention.

Below, a twelfth embodiment of the present invention will be described with reference to FIGS. 24 and 25. In FIG. 24 are shown: a pair of signal lines 80 for transmitting a power-source potential V1 and a control signal SG1; another pair of signal lines 81 for transmitting another power-source potential V2 and a control signal SG2.

There are also shown: a power-source-line switch (switching means) 82; a grounding-line switch (switching means) 83; and a logic portion (circuit portion) 84. The power-source-line switch 82 is composed of a PMOS transistor QP1 having a gate electrode connected to a control line for the control signal SG1 and a source electrode connected to a power-source line having a power-source potential V1. The grounding-line switch 83 is composed of an NMOS transistor QN1 having a gate electrode connected to a control line for the control signal SG2 and a source electrode connected to a power-source line having a power-source potential V2.

As shown in FIG. 25, the threshold voltage Vt(QP1) of the PMOS transistor QP1 composing the power-source-line switch 82 is adjusted to be equal to (as shown in the drawing) or less than the threshold voltage (−0.3 V) of the PMOS transistor composing the logic portion 84.

As shown in FIG. 25, the threshold voltage Vt(QN1) of the NMOS transistor QN1 composing the grounding-line switch 83 is adjusted to be equal to (as shown in the drawing)) or less than the threshold voltage (0.3 V) of the NMOS transistor composing the logic portion 84.

The power-source voltages V1 and V2 and the control signals SG1 and SG2 are controlled by a potential control circuit (potential controlling means) 77. Under the control, the power-source potential V1 is fixed at a predetermined potential Vcc (3.3 V) and the power-source potential V2 is fixed at the ground potential Vss. The control signal SG1 is set at the ground potential Vss (0 V) when the logic portion 84 is in the active mode so as to turn ON the power-source-line switch 82 (PMOS transistor QP1). When the logic portion 84 is in the sleep mode (in the inactivated state) and hence need not operate, the potential of the control signal SG1 shifts in such a direction as to turn OFF the power-source-line switch 82 (PMOS transistor QP1), i.e., in a potential increasing direction till it reaches a value (3.3 V+0.3 V) higher than the potential (Vcc=3.3 V) at the source electrode of the PMOS transistor QP1 by the magnitude of the extremely small potential dV (e.g., 0.3 V) at which the gate electrode thereof is overdriven. On the other hand, the control signal SG2 is set at the power-source potential Vcc (3.3 V) when the logic portion 84 is in the active state so as to turn ON the grounding-line switch 83 (NMOS transistor QN1). When the logic portion 84 is in the sleep mode, the potential of the control signal SG2 shifts in such a direction as to turn OFF the grounding-line switch 83 (NMOS transistor NP1), i.e., in a potential decreasing direction till it reaches a value (0 V–0.3 V) lower than the potential (Vss=0 V) at the source electrode of the NMOS transistor QN1 by the magnitude of the extremely small potential dV (e.g., 0.3 V) at which the gate electrode thereof is overdriven.

Since the threshold voltage of the transistor composing the logic portion is low (e.g., 0.3 V) in the conventional embodiment, the threshold voltage of the transistor composing the power-source-line switch or the grounding-line switch is set at a normal value (e.g., 0.6 V) so that the through current flowing in the logic portion when it is in the sleep mode is minimized by the power-source-line switch and the grounding-line switch. However, since the configuration needs a large current flow when the logic portion is in the active state, the power-source-line switch and the grounding-line switch should be composed of large-size transistors, resulting in an undesired increase in layout area. The problem of the increased layout area becomes more serious as the normal threshold voltage becomes closer to the power-source voltage.

However, since the threshold voltage of each of the MOS transistors QP1 and ON1 composing the power-source-line switch 82 and the grounding switch 83 is adjusted to be equal to or lower than the threshold voltage of each of the transistors composing the logic portion 84, a large current flows per unit channel when the logic portion 84 is in the active mode, which eliminates the necessity for using large-size transistors, resulting in a reduced layout area. In the sleep mode, moreover, the gate electrodes of the power-source-line switch 82 and the grounding-line switch 83 are overdriven to a potential higher than the potential at the source electrodes by a value obtained by subtracting the lower threshold voltage from the normal threshold voltage, which brings the switches 82 and 83 into a more completely OFF state (a state with higher impedance), so that the power-source-line switch 82 and the grounding-line switch 83 are cut off completely and therefore the through current flowing in the sleep mode is minimized.

Thirteenth Embodiment

Below, a thirteen embodiment of the present invention will be described with reference to FIGS. 25 and 26.

In contrast to the twelfth embodiment in which the gate electrodes of the power-source-line switch 82 and the grounding-line switch 83 are overdriven by the value (0.3 V) obtained by subtracting the lower threshold voltage from the normal threshold voltage, the present embodiment is so constructed as to overdrive the source electrodes of the power-source-line switch 82 and the grounding-line switch 83.

Figure 26:
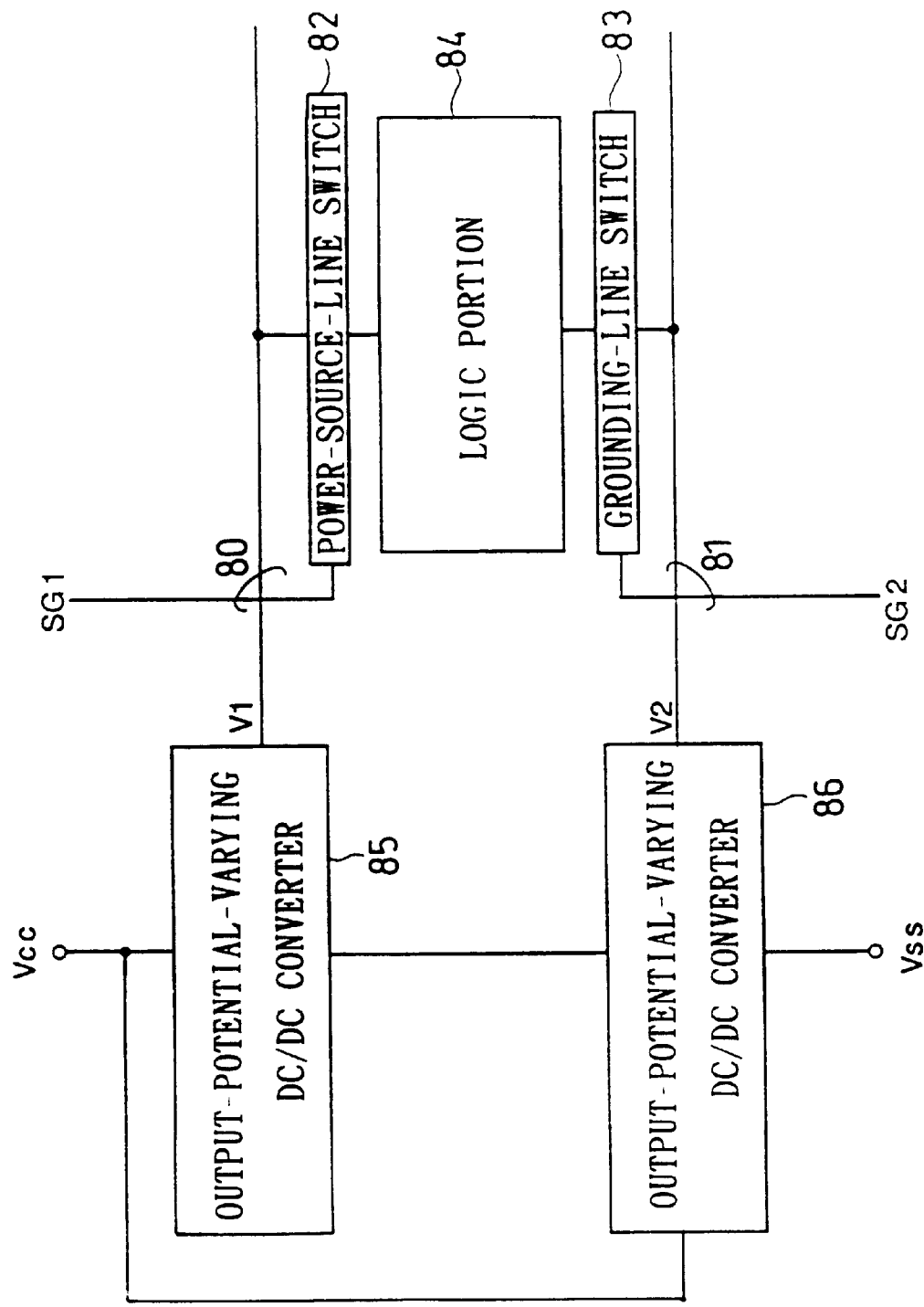
FIG. 26 is a schematic view showing the overall structure of the semiconductor integrated circuit in the thirteenth embodiment of the present invention.

FIG. 26 shows output-potential-varying DC/DC converters 85 and 86 for controlling the respective power-source potentials V1 and V2. The converters 85 and 86 convert the external power source Vcc and the ground potential Vss to the power-source potentials V1 and V2. If the converters 85 and 86 are internally constructed to use inductance, they vary output potentials thereof by changing a chopper ratio. If the converters 85 and 86 are of the type producing outputs through comparison with a reference voltage, they vary output potentials thereof by switching the reference voltage.

Specifically, the power-source potentials V1 and V2 and the control signals SG1 and SG2 are controlled as shown in FIG. 25 in comparison with the above twelfth embodiment.

In the active mode, the control signal SG1 is set at the ground potential Vss (0 V) so as to turn ON the power-source-line switch 82 (PMOS transistor QP1). In the sleep mode, the control signal SG1 is set at the power-source potential Vcc (3.3 V) so as to turn OFF the power-source-line switch 82.

On the other hand, the power-source potentials V1 and V2 are set at different potentials in the active mode and the sleep mode. Specifically, as shown in FIG. 25, the power-source potential V1 is set at the power-source potential Vcc (3.3 V) in the active mode to turn ON the power-source-line switch 82 (PMOS transistor QP1). In the sleep mode, the power-source potential V1 is changed in a direction (potential decreasing direction) opposite to the direction (potential increasing direction) in which the potential of the control signal SG1 shifts by the magnitude of the extremely small voltage dV (0.6 V–0.3 V=0.3 V) to reach a predetermined value (Vcc–dV=3.3 V–0.3 V), as shown in FIG. 25.

Likewise, the power-source potential V2 is set at the ground potential Vss (0 V) in the active mode to turn ON the grounding-line switch 83 (NMOS transistor QN1). In the sleep mode, the power-source potential V2 is changed in a direction (potential increasing direction) opposite to the direction (potential decreasing direction) in which the potential of the control signal SG2 shifts by the magnitude of the extremely small voltage dV (=0.3 V) to reach a predetermined value (Vss+dV=0 V+0.3 V).

Thus, in the present embodiment also, the power-source-line switch 82 and the grounding-line switch 83 can be cut off to a degree that a through current flowing in the sleep mode is negligible even when each of the switches 82 and 83 is composed of a transistor having a low threshold voltage, similarly to the twelfth embodiment. In the active state, a larger current flow is allowed per unit channel width because of the lower threshold voltage, so that there is no need for large-size transistors, resulting in a reduced layout area.

If the thirteenth embodiment is combined with the above twelfth embodiment to control the respective potentials at the gate and source electrodes of the MOS transistors composing the power-source-line switch 82 and the grounding-line switch 83 so that the transistors are cut off more completely, the threshold voltages of the MOS transistors composing the switches 82 and 83 can further be reduced to 0 V.

Fourteenth Embodiment

Below, a fourteenth embodiment of the present invention will be described with reference to FIGS. 27 to 30. The present embodiment relates to an improved semiconductor integrated circuit having a pipeline structure in which a logic circuit or an operational circuit is divided into a plurality of stages in accordance with the sequence of procedures performed thereby, with a switch circuit and a latch circuit disposed between the individual stages. The description will be limited to one stage shown in the drawings.

Figure 27:
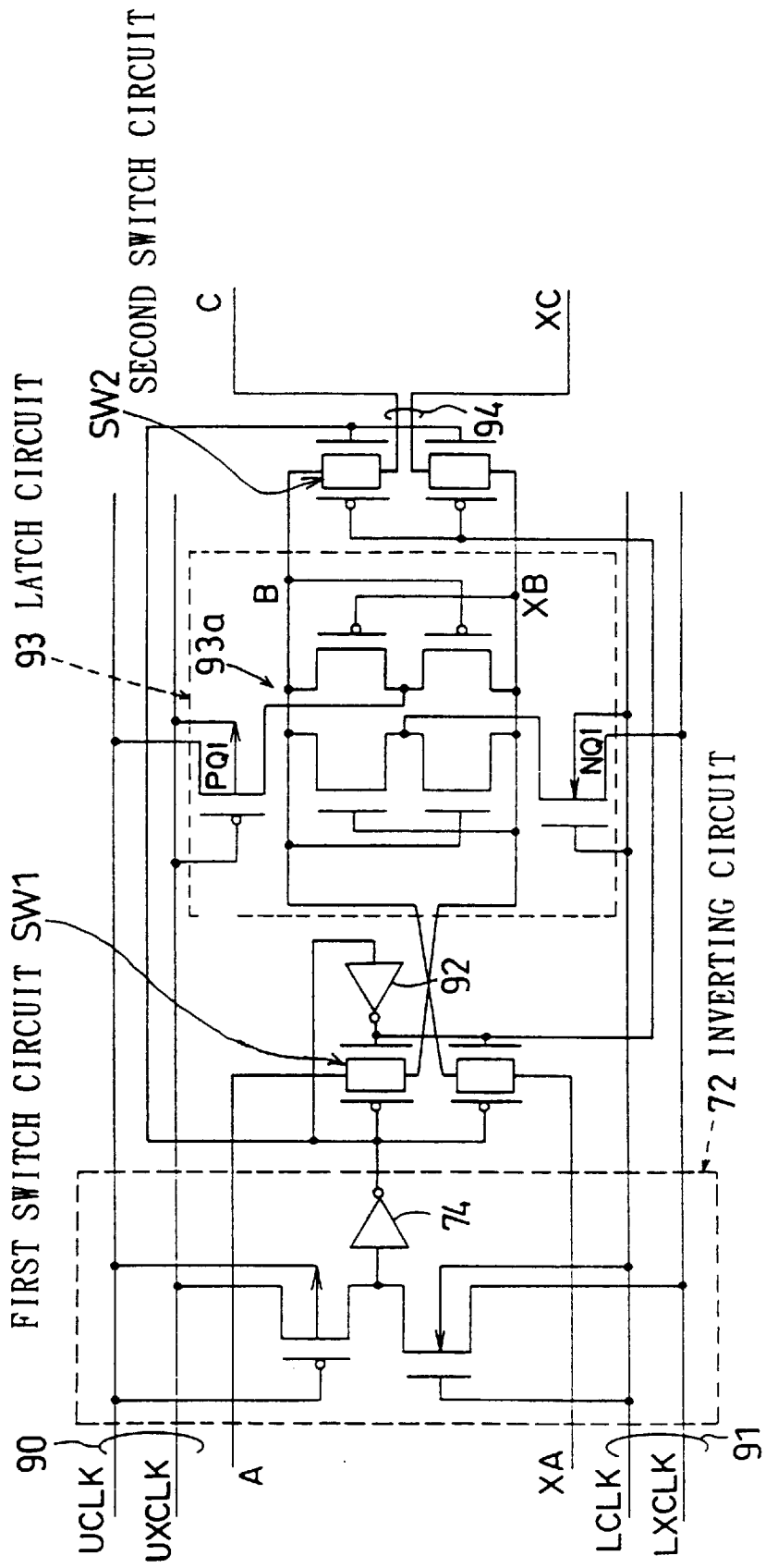
FIG. 27 is a view showing a specific structure of the semiconductor integrated circuit in a fourteenth embodiment of the present invention.
Figure 28:
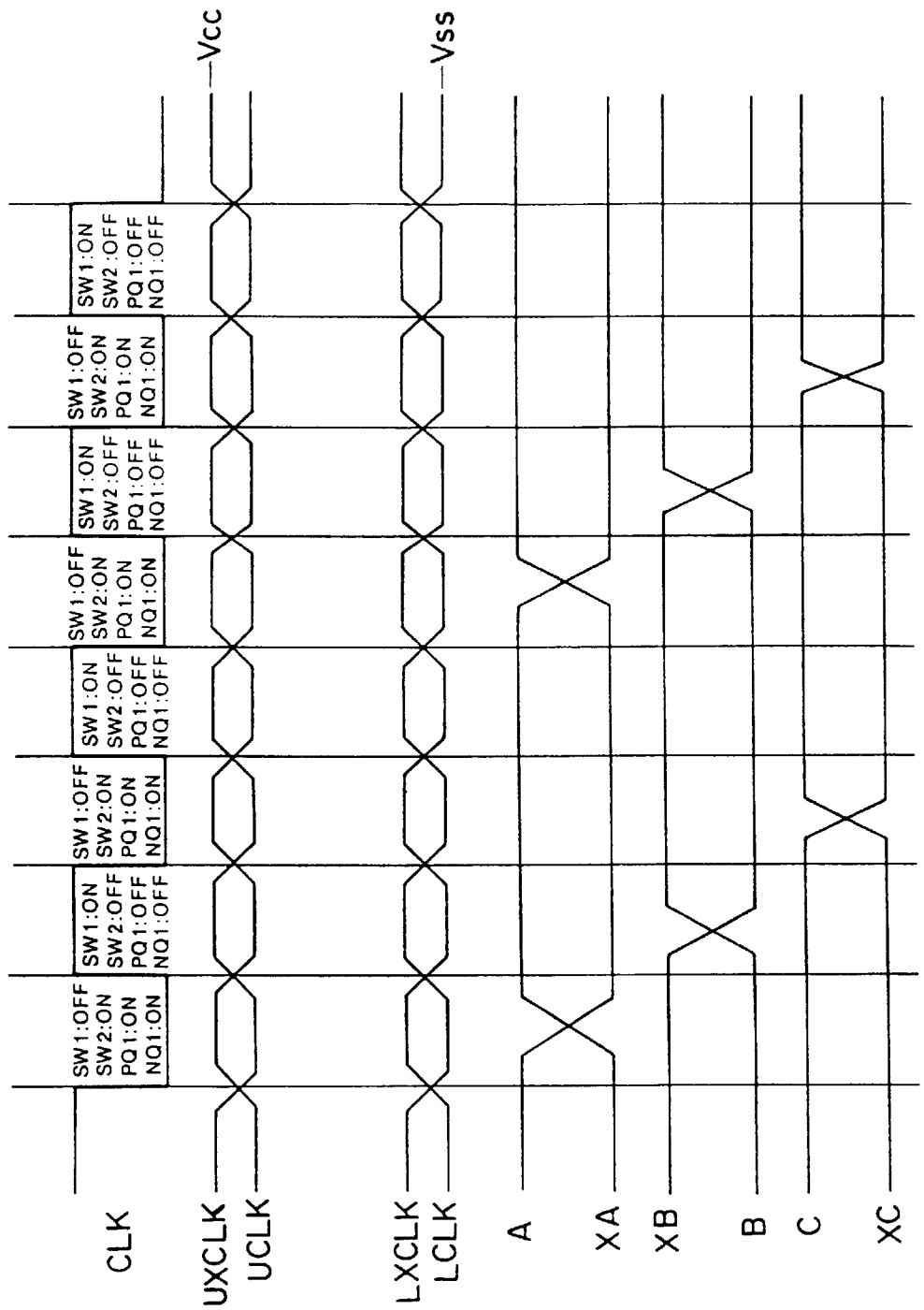
FIG. 28 is a timing chart of the semiconductor integrated circuit in the fourteenth embodiment of the present invention.

In FIG. 27 are shown: a first pair of differential clock signals UCLK, UXCLK having an amplitude voltage smaller than that of the external clock signal CLK of full amplitude in a CMOS transistor shown in FIG. 28, which is based on a power-source potential Vcc; a second pair of differential clock signals LCLK, LXCLK having an extremely small amplitude voltage, similarly to the first pair of differential clock signals, based on the ground potential Vss as shown in FIG. 28; a first pair of differential signal lines 90 for transmitting the first pair of differential clock signals UCLK, UXCLK; a second pair of differential signal lines 91 for transmitting the second pair of differential clock signals LCLK, LXCLK; and an inverting circuit (control means) 72 as the signal receiving circuit shown in FIG. 20. The inverting circuit 72 receives the first and second pairs of differential clock signals and outputs, from an internal inverting circuit 74 thereof, a clock signal (another clock signal) Q which is LOW when the external clock signal CLK is HIGH.

There are also shown an inverting circuit 92 for inverting the clock signal Q from the inverting circuit 72; a first switch circuit SW1 for receiving the clock signal Q from the inverting circuit 72 and an inversion signal XQ thereof from the inverting circuit 92, which is activated when the clock signal Q is LOW and receives differential data A, XA; and a second switch circuit SW2 for receiving the clock signal Q from the inverting circuit 72 and the inversion signal XQ from the inverting circuit 92, which is activated when the clock signal Q is HIGH.

There are also shown a latch circuit 93 for latching the differential data A, XA from the first switch circuit SW1 and outputting the latched differential data as a pair of differential signals B, XB to the second switch circuit SW2. The latch circuit 93 is of dynamic type and composed of a flip-flop portion 93a, a power-source switch (first switch portion) PQ1, and a ground-power-source switch (second switch portion) NQ1.

The power-source switch PQ1 is composed of a PMOS transistor having a gate electrode and a source electrode connected to the first pair of differential signal lines 90 and a drain electrode connected to the flip-flop portion 93a. The ground-power-source switch NQ1 is composed of an NMOS transistor having a gate electrode and a source electrode connected to the second pair of differential signal lines 91 and a drain electrode connected to the flip-flip portion 93a.

In the foregoing structure, the dynamic latch circuit 93 has its operation controlled by the power-source switch PQ1 and the ground-power-source switch NQ1 in the present embodiment, as shown in FIG. 28. Specifically, when the first switch circuit SW1 is disconnected during a first half period of the clock signal CLK (during which the clock signal CLK is LOW), both of the power-source switches PQ1 and NQ1 are turned ON and the second switch circuit SW2 is also turned ON, so that the data latched by the latch circuit 93 is outputted onto a pair of output lines 94 through the second switch circuit SW2, which determines the potentials of the respective outputs C, XC from the pair of output lines 94.

During a second half period of the clock signal CLK (during which the clock signal CLK is HIGH), on the other hand, the second switch circuit SW2 is turned OFF, while the first switch circuit SW1 is turned ON. However, since both of the power-source switches PQ1 and NQ1 for the dynamic latch circuit 93 are turned OFF, the differential contacts B, XB of the latch circuit 93 are determined by the input points A, XA. As described above, even in the case where the data value inputted lately has changed from the data value previously latched, the power sources of the latch circuit 93 (i.e. one UCLK of the first pair of differential signal lines 90 and one LXCLK of the second pair of differential signal lines 91) are disconnected upon the turning OFF of the power-source switches PQ1 and NQ1, so that data is inverted and written without producing a through current.

Thus, in the present embodiment, the first and second pairs of differential signal lines 90 and 91 are used to control the power supply to the dynamic latch circuit 93 so that new data is latched in the first half period of the clock signal CLK by avoiding a collision between the inputted data and the latched data and a differential amplifier receives even a signal composed of an extremely small potential difference in the second half period of the clock signal CLK, which enables stable amplification and data transfer.

Figure 29:
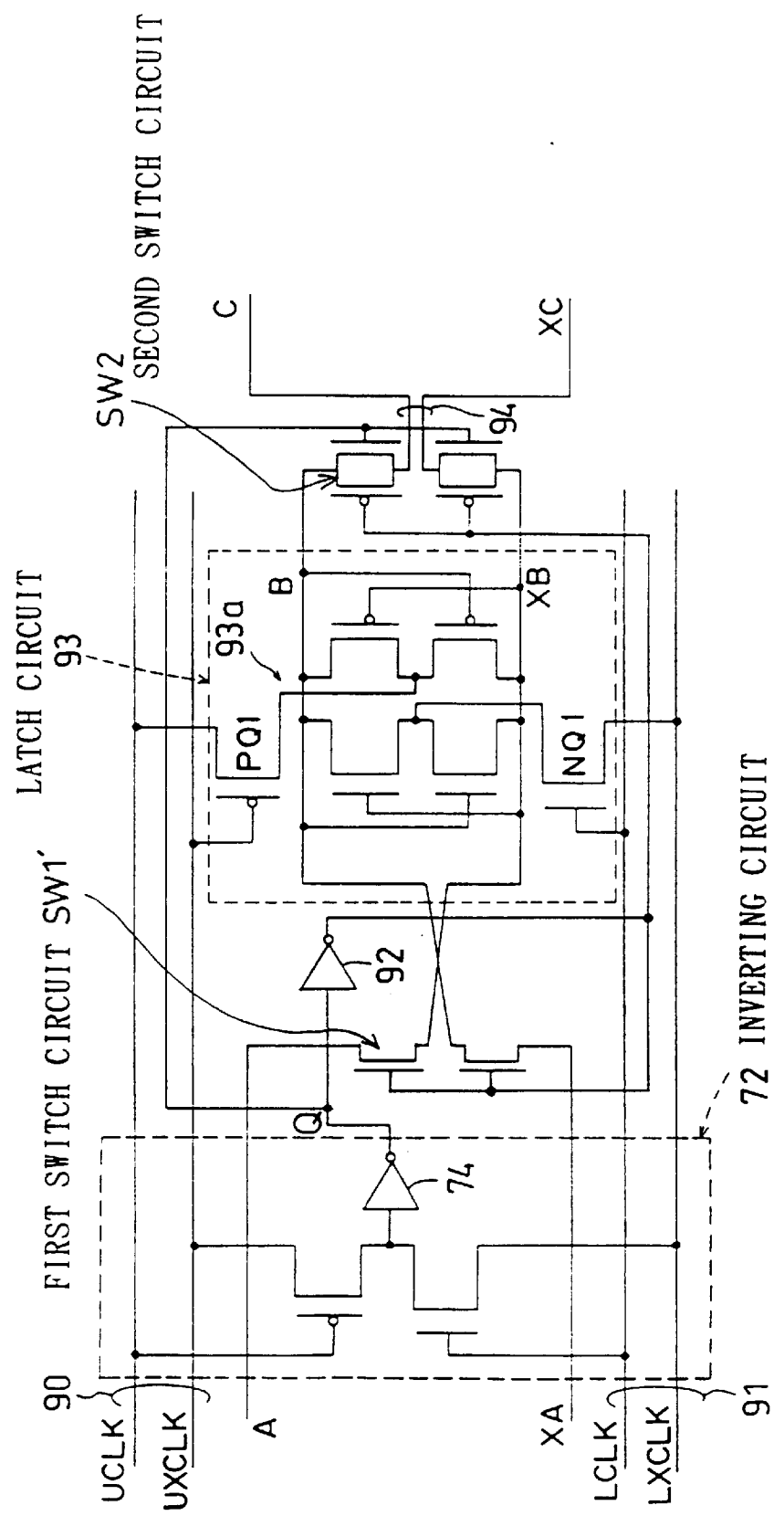
FIG. 29 is a view showing a specific structure of another semiconductor integrated circuit in the fourteenth embodiment.

FIG. 29 shows the case where a first switch circuit SW1' composed only of NMOS transistors is provided in place of the first switch circuit SW1 composed of the CMOS transistors shown in FIG. 28.

Figure 30:
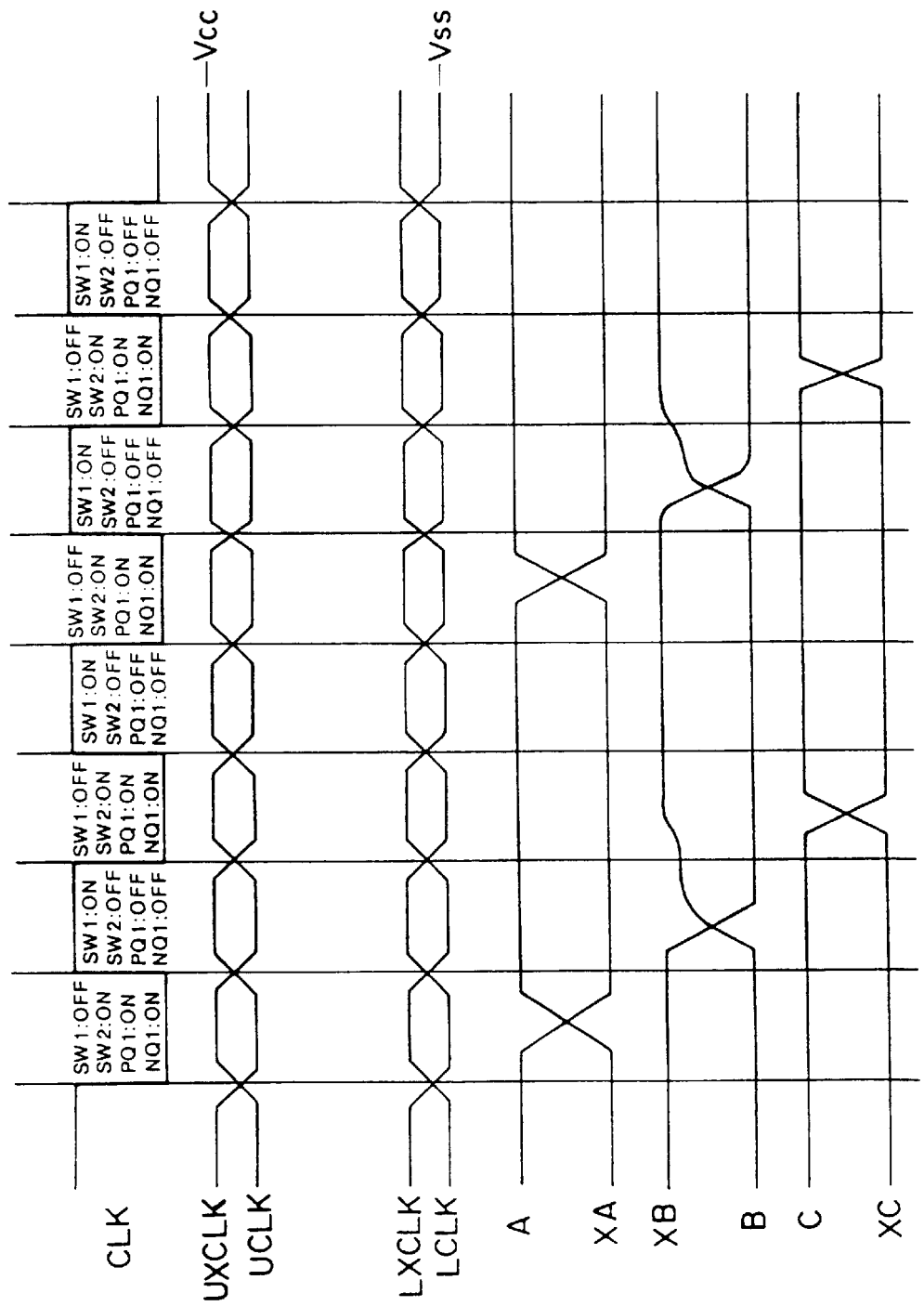
FIG. 30 is a timing chart of the semiconductor integrated circuit in the fourteenth embodiment of the present invention.

The first switch circuit SW1' thus composed only of the NMOS transistors has the advantage of reducing a charging/discharging current when the first switch SW1' is controlled over the first switch circuit SW1 composed of the CMOS transistors. However, the switch circuit of this type finds a difficulty in transmitting HIGH potentials, as shown in FIG. 30. In the case where a static inverting circuit is in the subsequent stage, therefore, a through current flows, resulting in an undesired increase in power consumption. However, a dynamic latch circuit 93 as shown in FIG. 29 would latch an extremely small voltage in the first half period of the clock signal CLK, as in the amplification of a data line in a memory, and turn ON the power-source switches PQ1 and NQ1 in the second half period of the clock signal CLK, thereby converting the latched extremely small voltage to a higher voltage in a CMOS transistor at a high speed.

Fifteenth Embodiment

Below, a description will be given to a fifteenth embodiment of the present invention with reference to FIGS. 31 and 32.

The present embodiment is an application of the semiconductor integrated circuit to a half latch circuit. In FIG. 31 are shown: a first switch circuit 100 composed of a PMOS transistor QP1; a second switch circuit 103 composed of an NMOS transistor QN1; and a CMOS inverting circuit 101 composed of another PMOS transistor QP3 and another NMOS transistor QN3 disposed between the first and second switch circuits 100 and 103, which has a gate electrode receiving a data signal IN.

The first switch circuit 100 (PMOS transistor QP1) has a gate electrode and a source electrode connected to a pair of differential signal lines 90 for a first pair of differential signals UCLK, UXCLK. The second switch circuit 103 (NMOS transistor QN1) has a gate electrode and a source electrode connected to a pair of differential signal lines 91 for a second pair of differential signals LCLK, LXCLK.

The first and second switch circuits 100 and 103 and the CMOS inverting circuit 101 constitute a first clocked inverting circuit 105. The half latch circuit of FIG. 31 is composed of the first clocked inverting circuit 105, a second clocked inverting circuit 106 having the same structure as that of the first clocked inverting circuit 105 and connected in cascade with the first clocked inverting circuit 105 in two stages, and an inverting circuit 102 receiving an output from the second clocked inverting circuit 106 so that an output from the inverting circuit 102 is feedbacked to the connection point between the two clocked inverting circuits connected in cascade.

In the half latch circuit of the present embodiment, four switch circuits QP1, QN1, QP2, and QN2 operate in synchronization with the potential changes of the first and second pairs of differential signals UCLK, UXCLK, LCLK, and LXCLK.

Figure 33:
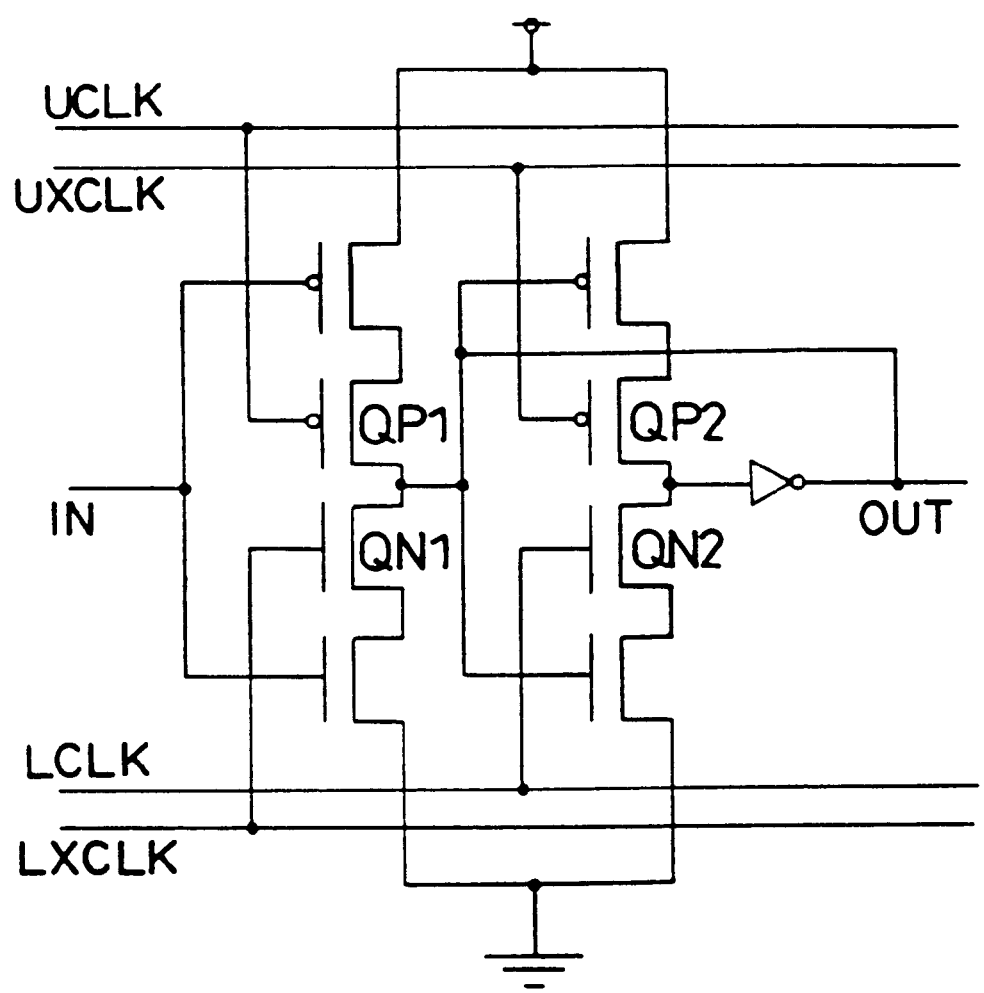
FIG. 33 is a view showing a specific structure of a conventional semiconductor integrated circuit corresponding to the fifteenth embodiment of the present invention.

FIG. 33 shows a conventional embodiment corresponding to the present embodiment. The circuit shown in FIG. 33 is disclosed in Japanese Laid-Open Patent Publication HEI 61-20782. In the circuit, four clock signal lines are used to reduce charges accumulated and released by the clock signal. Signals on the respective signal lines, each having an amplitude voltage corresponding to ½ of a power-source voltage, are driven in synchronization with the clock signal. By recycling the charges accumulated and released between the pair of signal lines for the differential signals UCLK, UXCLK having potentials shifting from the power-source voltage to an intermediate potential and the pair of signal lines for the differential signals LCLK, LXCLK having potential shifting from the ground potential to the intermediate potential, power consumption for generating the clock signal is reduced. However, since the amplitude can be limited only to ½ of that of the power-source voltage and the signal is inputted only to the gate electrodes of the switch circuits QP1, QN1, QP2, and QN2 composing the clocked inverters, the gain of each switch circuit is unsatisfactory, resulting a longer delay time.

In the present embodiment, by contrast, the threshold voltage Vt of the switch circuits QP1, QN1, QP2, and QN2 composed of the PMOS transistors and NMOS transistors and composing the clocked inverting circuits can be reduced by the value of the potential difference between the first and second pairs of differential clock signals. If the gate voltage, source voltage, and threshold voltage of the MOS transistor are represented by Vg, Vs, and Vt, a voltage (Vg−Vs−Vt) for determining a current for driving the MOS transistor is increased. If the amplitude is assumed to be the same, a larger current is allowed to flow in the present embodiment than in the conventional embodiment. Therefore, higher-speed operation and a reduced delay time are achieved in the present embodiment than in the conventional embodiment. If the delay time is assumed to be the same, lower power consumption is achieved in the present embodiment than in the conventional embodiment shown in FIG. 33, since the differential clock signals to be transmitted have an extremely small amplitude voltage dV in the present embodiment.

Sixteenth Embodiment

Below, a sixteenth embodiment will be described with reference to FIG. 34.

Figure 31:
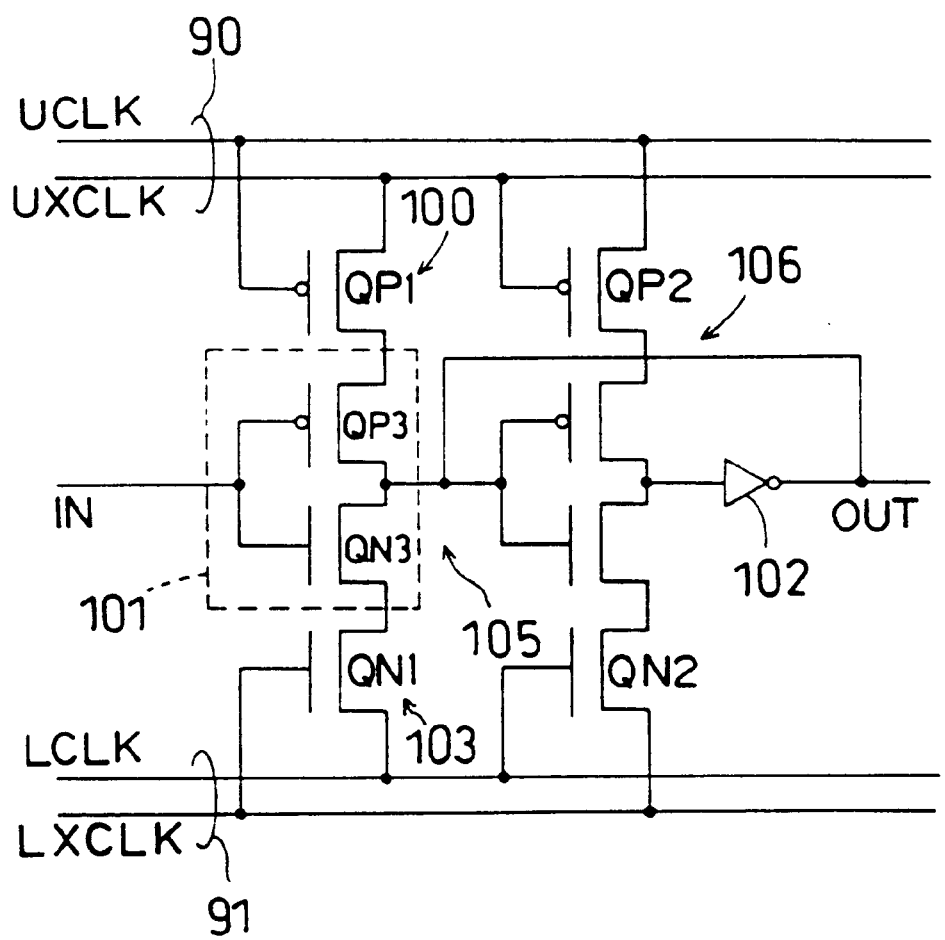
FIG. 31 is a view showing a specific structure of the semiconductor integrated circuit in a fifteenth embodiment of the present invention.
Figure 32:
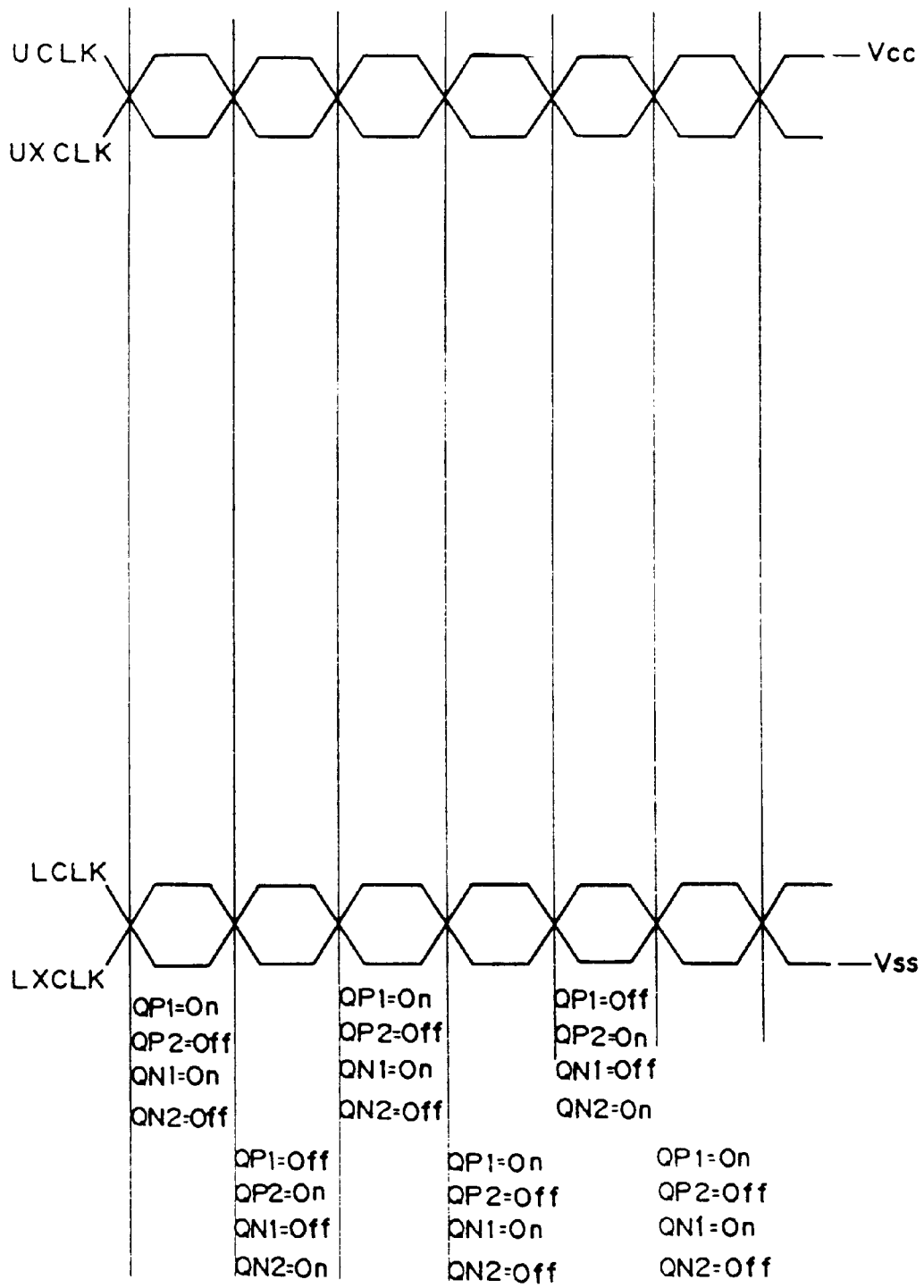
FIG. 32 is a timing chart of the semiconductor integrated circuit in the fifteenth embodiment of the present invention.

The present embodiment is obtained by adding a circuit to the structure of the fifteenth embodiment of FIG. 31. The description will be limited to the structure of the added circuit.

Figure 34:
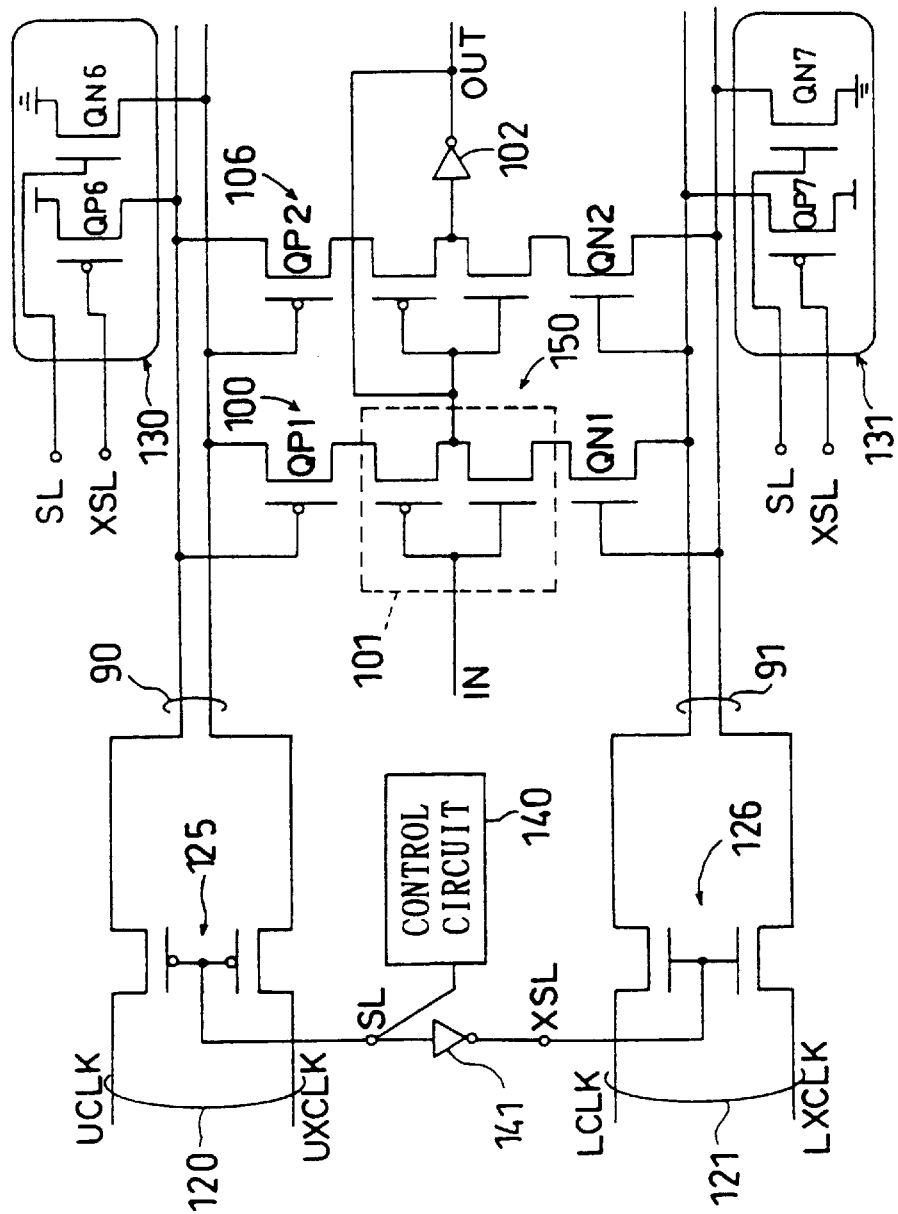
FIG. 34 is a view showing a specific structure of the semiconductor integrated circuit in a sixteenth embodiment of the present invention.

In FIG. 34 are shown: first and second pairs of source clock differential signal lines 120 and 121 extending throughout a chip; a first switch circuit 125 composed of two PMOS transistors for connecting and disconnecting the first pair of source clock differential signal lines 120 and the first pair of differential signal lines 90; and a second switch circuit 126 for connecting and disconnecting the second pair of source clock differential signal lines 121 and the second pair of clock differential signal lines 91.

There are also shown: a first connecting circuit 130 for fixing the first pair of clock differential signal lines 90 at predetermined and ground potentials, respectively; and a second connecting circuit 131 for fixing the second pair of clock differential signal lines 91 at predetermined and ground potentials, respectively.

The first connecting circuit 130 is composed of an NMOS transistor QN6 for grounding one (the line for UXCLK) of the first pair of clock differential signal lines 90 connected to the gate electrode of the PMOS transistor QP2 composing the second clocked inverting circuit 106 and a PMOS transistor QP6 for connecting, to a predetermined power source, the other (the line for UCLK) of the first pair of clock differential signal lines 90 connected to the source electrode of the PMOS transistor QP2 composing the second clocked inverting circuit 106.

The second connecting circuit 131 is composed of a PMOS transistor QP7 for connecting, to a predetermined power source, one (the line for LCLK) of the second pair of clock differential signal lines 91 connected to the gate electrode of the NMOS transistor QN2 composing the second clocked inverting circuit 106 and an NMOS transistor QN7 for grounding the other (the line for LXCLK) of the second pair of clock differential signal lines 91 connected to the source electrode of the NMOS transistor QN2 composing the second clocked inverting circuit 106.

A control circuit 140 is for controlling the first and second switch circuits 125 and 126 and the first and second connecting circuits 130 and 131. The control circuit 140 generates a control signal SL which is set at a HIGH potential when data inputted to the control circuits 105 and 106 does not change with te passage of time or during the period during which the data need not be transferred to the subsequent stage. The control signal SL is inputted to the respective gate electrodes of the first switch circuit (PMOS transistor) 125, the NMOS transistor QN6 composing the first connecting circuit 130, and the NMOS transistor QN7 of the second connecting circuit 131. On the other hand, the control signal SL is inverted by the inverting circuit 141 and an inversion signal XSL thereof is inputted to the respective gate electrodes of the second switch circuit (NMOS transistor) 126, the PMOS transistor QP6 composing the first connecting circuit 130, and the PMOS transistor QP7 composing the second connecting circuit 131.

Thus, in the present embodiment, the control circuit 140 outputs the control signal SL when the data inputted to the clocked inverting circuits 105 and 106 does not change with the passage of time or during the period during which the data need not be transferred to the subsequent stage, so that the first and second pairs of clock differential signal lines 90 and 91 are disconnected from the first and second pairs of source clock differential signal lines 120 and 121, respectively.

At that time, the PMOS transistor QP2 and NMOS transistor QN2 composing the second clocked inverting circuit 106 are both turned ON so that the latched data is held as it is.

As described above, the present invention provides a signal receiving circuit which can operate statically at a high speed in response to even differential signals having a small amplitude voltage and thereby achieves transmission of the differential signals having the small amplitude voltage and reduced power consumption for driving a signal to be transmitted. When the signal to be transmitted is a clock signal, the influence of wiring resistance can be reduced without increasing the width of a line for the clock signal as has conventionally been increased, while the problem of increased power consumption due to increased wiring capacitance can be prevented. The present invention has a wide range of practical applications since it provides a low-power, low-cost signal transmitting circuit, signal receiving circuit, and the like without increasing the chip area and using any special process.

We claim:

1. A signal transmitting circuit for transmitting a signal to a signal receiving circuit, comprising:
   a differential-signal generating portion for expressing said signal as a differential signal composed of two signals having respective potentials shifting in opposite directions to each other; and
   a pair of lines for differential transmitting the differential signal composed of the two signals generated from said differential-signal generating portion,
   wherein said pair of lines for differential transmitting said differential signal supply power of a power source of said signal receiving circuit.

2. A signal transmitting/receiving circuit comprising:
   a differential-signal generating portion for expressing a signal to be transmitted as a differential signal composed of two signals having respective potentials shifting in opposite directions to each other;
   a pair of lines for differential transmitting the differential signal composed of the two signals generated from said differential-signal generating portion; and
   a signal receiving circuit composed of a transistor, wherein
   said signal receiving circuit receives the differential signals transmitted by s aid pair of lines and respective potentials at at least two of a source electrode, a gate electrode, and a substrate electrode of said transistor change in synchronization with the change of the differential signals.

3. A signal transmitting circuit or signal transmitting/receiving circuit according to claim 1 or 2, wherein
   the signal to be transmitted is a clock signal.

4. A signal transmitting circuit or signal transmitting/receiving circuit according to claim 1 or 2, wherein
   the differential-signal generating portion receives said signal having a first amplitude voltage and converts the signal to a differential signal composed of two signals each having a second amplitude voltage smaller than said first amplitude voltage.

5. A signal transmitting circuit or signal transmitting/receiving circuit according to claim 4, wherein
   the differential-signal generating portion comprises:
      an inverter for inverting the signal having said first amplitude voltage; and
      first and second push-pull circuits for receiving said signal and an inversion signal from said inverter, said first and second push-pull circuits being connected to a pair of output terminals, wherein
      said first push-pull circuit is connected to a first power-source terminal having a predetermined potential so as to connect one of said output terminals to said first power-source terminal when said signal is HIGH and to connect the other of said output terminals to said first power-source terminal when the inversion signal from said inverter is HIGH and
      said second push-pull circuit is connected to a second power-source terminal having another potential different from said predetermined potential by the magnitude of said second amplitude voltage so as to connect the other of said output terminals to said second power-source terminal when said signal is HIGH and to connect one of said output terminals to said second power-source terminal when the inversion signal from said inverter is HIGH.

6. A signal transmitting method comprising:
   expressing a signal to be transmitted as a differential signal composed of two signals having respective potentials shifting in opposite directions to each other, one of the two signals composing said differential signal supplying power of a power source of a signal receiving circuit for receiving both the two signals composing said differential signal, and transmitting the differential signal to said signal receiving circuit.

7. A signal transmitting method according to claim 6, wherein
   said two signals of said differential signal have an extremely small amplitude voltage smaller than the difference between the potential at the power source of said signal receiving circuit and the ground potential.

8. A signal transmitting method according to claim 6, wherein
   the signal to be transmitted is a clock signal.

9. A signal transmitting method according to claim 6, wherein said signal to be transmitted has a first amplitude voltage, further comprising:
   converting said signal to be transmitted to a differential signal having a second amplitude voltage which is smaller than said first amplitude voltage and which is based on the potential at the power source of the signal receiving circuit; and
   transmitting the differential signal.

10. A signal transmitting method according to claim 6, further comprising:
    receiving said signal having a first amplitude voltage;
    converting said received signal to a differential signal composed of two signals each having a second amplitude voltage smaller than said first amplitude voltage which is based on a value in the vicinity of the potential at the power source of the signal receiving circuit;
    converting said received signal to a differential signal composed of two signals each having a third amplitude voltage smaller than said first amplitude voltage which is based on a value in the vicinity of the ground potential; and
    transmitting the differential signal composed of two signals each having said second amplitude voltage and the differential signal composed of two signals each having said third amplitude voltage.

11. A signal transmitting/receiving method comprising:
    expressing a signal to be transmitted as a pair of differential signals having potentials shifting in opposite directions, the potential of one of the differential signals being a potential at a power source of a signal receiving circuit, and transmitting the differential signals; and
    receiving said transmitted differential signals at any two of a source electrode, a gate electrode, and a substrate electrode of a transistor.

12. A signal transmitting circuit for transmitting a signal to a signal receiving circuit, comprising:
    a first differential-signal generating portion for expressing said signal as a pair of differential signals having potentials shifting in opposite directions, the potential of one of said differential signals being a potential at a power source of said signal receiving circuit;

a second differential-signal generating portion for expressing said signal as said pair of differential signals, the potential of one of the differential signals being the ground potential; and two pairs of lines for differentially transmitting the two pairs of differential signals generated from said first and second differential-signal generating portions.

13. A signal transmitting circuit according to claim 12, wherein the first and second differential-signal generating portions are connected in series between a power source and a grounding line and a resistor is disposed between said first and second differential-signal generating portions.

14. A signal transmitting circuit according to claim 12, wherein the first and second differential-signal generating portions are connected in series between a power source and a grounding line, a third differential-signal generating portion having the same structure as the structure of said first or second differential-signal generating portion is disposed between said first and second differential-signal generating portions, and a capacitor having a capacitance smaller than a stray capacitance of the lines for transmitting the differential signals is connected to said third differential-signal generating portion.

15. A signal transmitting circuit according to claim 12, wherein each of said first and second differential-signal generating portions receives a signal having a first amplitude voltage, said first differential-signal generating portion generates a pair of differential signals having a second amplitude voltage smaller than said first amplitude voltage, and said second differential-signal generating portion generates a pair of differential signals having a third amplitude voltage smaller than said first amplitude voltage.

16. A signal transmitting circuit according to claim 15, wherein said first differential-signal generating portion comprises a push-pull circuit including a PMOS transistor and being connected to two power sources having a potential difference equal to said second amplitude voltage therebetween and said second differential-signal generating portion comprises a push-pull circuit including an NMOS transistor and being connected to two power sources having a potential difference equal to said third amplitude voltage therebetween.

17. A signal transmitting/receiving method comprising:

receiving a signal having a first amplitude voltage;

converting said received signal to a pair of differential signals having potentials shifting in opposite directions, said pair of differential signals having a second amplitude voltage smaller than said first amplitude voltage, the potential of one of said pair of differential signals being in the vicinity of a potential at a power source of a signal receiving circuit;

converting said received signal to said pair of differential signals, said pair of differential signals having a third amplitude voltage smaller than said first amplitude voltage, the potential of one of said pair of differential signals being in the vicinity of the ground potential;

transmitting the pair of differential signals having said second amplitude voltage and the pair of differential signals having said third amplitude voltage; and then receiving said transmitted two pairs of differential signals and outputting a signal having a fourth amplitude voltage larger than said second and third amplitude voltages of the two pairs of differential signals by statically responding to electric changes of the two pairs of differential signals.

18. A semiconductor integrated circuit composed of a clocked inverting circuit comprising an inverting circuit for receiving data, inverting the data, and outputting inverted data, a first switch circuit disposed between said inverting circuit and a power-source line, and a second switch circuit disposed between said inverting circuit and a grounding line, said semiconductor integrated circuit having a pair of lines for transmitting a first pair of differential clock signals having potentials shifting in opposite directions, one of said pair of lines also serving as the power-source line and a pair of lines for transmitting a second pair of differential clock signals, one of said pair of lines also serving as the grounding line, wherein said first switch circuit is connected to the pair of lines for transmitting said first differential clock signals to be controlled by the first differential clock signals and said second switch circuit is connected to the pair of lines for transmitting said second differential clock signals to be controlled by the second differential clock signals.

19. A semiconductor integrated circuit according to claim 18, wherein said first switch circuit is composed of a PMOS transistor having a gate electrode and a source electrode connected to the pair of lines for transmitting said first differential clock signals.

20. A semiconductor integrated circuit according to claim 18, wherein said second switch circuit is composed of an NMOS transistor having a gate electrode and a source electrode connected to the pair of lines for transmitting said second differential clock signals.

* * * * *

UNITED STATES PATENT AND TRADEMARK OFFICE
CERTIFICATE OF CORRECTION

PATENT NO. : 6,028,455
DATED : February 22, 2000
INVENTOR(S) : Yamauchi

It is certified that error appears in the above-identified patent and that said Letters Patent is hereby corrected as shown below:

On the Cover Page:

In the Title section, after "SIGNAL TRANSMITTING METHOD," insert --SIGNAL RECEIVING METHOD,--.

Signed and Sealed this

Twenty-fourth Day of April, 2001

Attest:

NICHOLAS P. GODICI

Attesting Officer

Acting Director of the United States Patent and Trademark Office